(12) United States Patent
Terada et al.

(10) Patent No.: US 9,132,355 B2
(45) Date of Patent: Sep. 15, 2015

(54) GAME DEVICE, METHOD FOR CONTROLLING GAME DEVICE, PROGRAM, AND INFORMATION STORAGE MEDIUM

(75) Inventors: Toshiyuki Terada, Chiba (JP); Ryuji Mimura, Okayama (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 455 days.

(21) Appl. No.: 13/059,917

(22) PCT Filed: Jun. 3, 2009

(86) PCT No.: PCT/JP2009/060176
§ 371 (c)(1),
(2), (4) Date: May 4, 2011

(87) PCT Pub. No.: WO2010/021182
PCT Pub. Date: Feb. 25, 2010

(65) Prior Publication Data
US 2011/0207532 A1 Aug. 25, 2011

(30) Foreign Application Priority Data
Aug. 22, 2008 (JP) ................................. 2008-214608

(51) Int. Cl.
*A63F 13/5258* (2014.01)
*A63F 13/40* (2014.01)
(Continued)

(52) U.S. Cl.
CPC ............. *A63F 13/5258* (2014.09); *A63F 13/10* (2013.01); *G06T 15/20* (2013.01);
(Continued)

(58) Field of Classification Search
CPC ................................................ A63F 2300/6684
USPC ....................................................... 463/30–33
See application file for complete search history.

(56) References Cited

U.S. PATENT DOCUMENTS 6,371,849 B1 * 4/2002 Togami ............................ 463/4
6,394,897 B1 * 5/2002 Togami ............................ 463/4
(Continued)

FOREIGN PATENT DOCUMENTS

JP 2001-070632 A 3/2001
JP 3833445 B2 12/2001
(Continued)

OTHER PUBLICATIONS

Taiwanese Office Action in counterpart application No. 9812275, dated Aug. 13, 2012.

*Primary Examiner* — Bach Hoang
(74) *Attorney, Agent, or Firm* — Sughrue Mion, PLLC

(57) ABSTRACT

To provide a game device which enables a user to relatively easily know of the existence of a player character suitable as a pass target or an area suitable as a movement destination. A display control unit (72) displays a partial area of a game space on a game screen based on a position of a reference player character selected from among player characters belonging to a first team and a second team or a position of a moving object. An acquiring unit (72a) acquires, in a case where the first team is in possession of the moving object, a movement destination candidate or a pass target candidate of a player character belonging to the first team based on the positions of the player characters belonging to the second team. A control unit (72c) controls the partial area based on the position of the reference player character or the position of the moving object, and the movement destination candidate or the pass target candidate acquired by the acquiring unit (72a).

24 Claims, 17 Drawing Sheets

(51) Int. Cl.
  *G06T 15/20* (2011.01)
  *G06T 19/00* (2011.01)
(52) U.S. Cl.
  CPC .......... *G06T 19/003* (2013.01); *A63F 2300/64* (2013.01); *A63F 2300/6623* (2013.01); *A63F 2300/6661* (2013.01); *A63F 2300/8011* (2013.01)

(56) References Cited

U.S. PATENT DOCUMENTS

| | | | |
|---|---|---|---|
| 6,428,411 B1 * | 8/2002 | Togami | 463/4 |
| 6,542,155 B1 * | 4/2003 | Mifune et al. | 345/428 |
| 6,603,479 B1 * | 8/2003 | Mifune et al. | 345/474 |
| 6,835,136 B2 * | 12/2004 | Kitao | 463/33 |
| 6,989,829 B2 * | 1/2006 | Haga et al. | 345/418 |
| 7,199,794 B2 * | 4/2007 | Mifune et al. | 345/428 |
| 7,532,211 B2 * | 5/2009 | Haga et al. | 345/419 |
| 7,677,978 B2 * | 3/2010 | Tawara | 463/37 |
| 7,708,641 B2 * | 5/2010 | Tawara | 463/31 |
| 7,737,968 B2 * | 6/2010 | Haga et al. | 345/419 |
| 7,806,767 B2 * | 10/2010 | Kitao | 463/31 |
| 2002/0065119 A1 * | 5/2002 | Togami | 463/4 |
| 2004/0209684 A1 * | 10/2004 | Hisano | 463/32 |
| 2005/0159217 A1 * | 7/2005 | Tawara | 463/31 |
| 2006/0258450 A1 * | 11/2006 | Ishihata et al. | 463/31 |
| 2009/0280898 A1 * | 11/2009 | Izumi | 463/30 |
| 2010/0178968 A1 | 7/2010 | Mori | |

FOREIGN PATENT DOCUMENTS

| | | |
|---|---|---|
| JP | 2007-175207 A | 7/2007 |
| JP | 2007-260157 A | 10/2007 |
| TW | 200833401 A | 8/2008 |

* cited by examiner

GAME DEVICE, METHOD FOR CONTROLLING GAME DEVICE, PROGRAM, AND INFORMATION STORAGE MEDIUM

TECHNICAL FIELD

The present invention relates to a game device, a method for controlling a game device, a program, and an information storage medium.

BACKGROUND ART

A game of a sport played between a first team and a second team using a moving object (such as, for example, a ball or a puck) is known. For example, a soccer game, a basketball game, a rugby game, an American football game, and an ice hockey game are known.

In such a sport game, in many cases, in place of displaying the entirety of the game space on a game screen, only a partial area of the game space is displayed on the game screen. In a case where only a partial area of the game space is displayed on the game screen, a user cannot know the situation of the area which is not displayed on the game screen. Because of this, in the above-described sport game, in order to allow the user to know the situation of the area which is not displayed on the game screen, a radar image for guiding positions of player characters and the moving object is displayed on the game screen.

The user can refer to the radar image, to know the positional situation of the player characters and moving object in the area which is not displayed on the game screen. For example, the user can know that a player character suitable as a pass target (pass partner) exists in the area which is not displayed on the game screen. Here, "a player character suitable as a pass target" refers to, for example, a player character having no player character of the opponent team positioned nearby (hereinafter referred to as a "player character which is free"). In addition, for example, the user can know that an area suitable as a movement destination exists in the area which is not displayed on the game screen. Here, "an area suitable as a movement destination" refers to an area having no player character positioned nearby (hereinafter referred to as an "open space").

[Patent Document 1] JP 2007-175207 A

DISCLOSURE OF THE INVENTION

Problems to be Solved by the Invention

However, an operation for the player character while referring to the above-described radar image may be difficult for a user (in particular, a user with less experience). Because of this, for example, in a case where a player character suitable as a pass target or an area suitable as a movement destination exists in an area which is not displayed on the game screen, it may be difficult for the user to know of the existence of such a player character or such an area.

The present invention was conceived in view of the above-described circumstances, and an advantage of the present invention is that a game device, a method for controlling a game device, a program, and an information storage medium are provided which enable a user to relatively easily know of the existence of, for example, a player character suitable as a pass target or an area suitable as a movement destination.

Means for Solving the Problems

In order to solve the above described object, a game device according to the present invention is a game device which executes a sport game played between a first team and a second team using a moving object, the game device comprising storage means for storing positions, in a game space, of player characters belonging to the first team, player characters belonging to the second team, and the moving object, and display control means for displaying a partial area of the game space on a game screen based on a position of a reference player character selected from among the player characters belonging to the first team and the player characters belonging to the second team, or the position of the moving object, wherein the display control means comprises acquiring means for acquiring, in a case where the first team is in possession of the moving object, a movement destination candidate or a pass target candidate of a player character belonging to the first team based on the positions of the player characters belonging to the second team, and control means for controlling the partial area based on the position of the reference player character or the position of the moving object, and the movement destination candidate or the pass target candidate acquired by the acquiring means.

A method for controlling a game device according to the present invention is a method for controlling a game device which executes a sport game played between a first team and a second team using a moving object, the method comprising a step of reading stored content of a storage which stores positions, in a game space, of player characters belonging to the first team, player characters belonging to the second team, and the moving object, and a display control step in which a partial area of the game space is displayed on a game screen based on a position of a reference player character selected from among the player characters belonging to the first team and the player characters belonging to the second team, or the position of the moving object, wherein the display control step comprises an acquiring step in which, in a case where the first team is in possession of the moving object, a movement destination candidate or a pass target candidate of a player character belonging to the first team is acquired based on the positions of the player characters belonging to the second team, and a control step in which the partial area is controlled based on the position of the reference player character or the position of the moving object, and the movement destination candidate or the pass target candidate acquired at the acquiring step.

A program according to the present invention is a program for causing a computer to function as a game device which executes a sport game played between a first team and a second team using a moving object, the program causing the computer to function as means for reading stored content of a storage which stores positions, in a game space, of player characters belonging to the first team, player characters belonging to the second team, and the moving object, and display control means for displaying a partial area of the game space on a game screen based on a position of a reference player character selected from among the player characters belonging to the first team and the player characters belonging to the second team, or the position of the moving object, wherein the display control means comprises acquiring means for acquiring, in a case where the first team is in possession of the moving object, a movement destination candidate or a pass target candidate of a player character belonging to the first team based on the positions of the player characters belonging to the second team, and control means for controlling the partial area based on the position of the reference player character or the position of the moving object, and the movement destination candidate or the pass target candidate acquired by the acquiring means.

An information storage medium according to the present invention is a computer-readable information storage medium which stores the above-described program.

Here, a "reference player character" is, for example, a player character operated by the user or a player character which is in possession of the moving object. In addition, the "game space" may be a two-dimensional game space in which the position or the like is identified with two coordinates or a three-dimensional game space in which the position or the like is identified with three coordinates.

According to the present invention, for example, it is possible to enable a user to relatively easily know of the existence of a player character suitable as a pass target or an area suitable as a movement destination.

According to one aspect of the present invention, the game screen may represent a scene of the game space viewed from a virtual camera. The control means may control the partial area by controlling a state of the virtual camera based on the position of the reference player character or the position of the moving object, and the movement destination candidate or the pass target candidate acquired by the acquiring means.

In this aspect of the present invention, the state of the virtual camera may be controlled based on a distance between the position of the reference player character, or the position of the moving object, and the movement destination candidate or the pass target candidate acquired by the acquiring means.

According to another aspect of the present invention, the control means may comprise first control means for controlling the partial area based on the position of the reference player character or the position of the moving object, second control means for controlling the partial area based on the position of the reference player character or the position of the moving object, and the movement destination candidate or the pass target candidate acquired by the acquiring means, and switching means for switching between a state in which the control is executed by the first control means and a state in which the control is executed by the second control means.

In this aspect of the present invention, the switching means may switch from the state in which the control is executed by the first control means to the state in which the control is executed by the second control means, if the movement destination candidate or the pass target candidate acquired by the acquiring means is not included in the partial area in a case where the control is executed by the first control means.

In this aspect of the present invention, the game device may further comprise means for storing match status information indicating a match status. The switching means may comprise means for switching from the state in which the control is executed by the first control means to the state in which the control is executed by the second control means based on a given probability, if the movement destination candidate or the pass target candidate acquired by the acquiring means is not included in the partial area in the state in the case where the control is executed by the first control means, and means for controlling the probability based on the match status information.

According to another aspect of the present invention, the game screen may comprise a plurality of portion areas. The display control means may restrict display of the partial area of the game space in a portion area, among the plurality of portion areas, other than a portion area corresponding to the movement destination candidate or the pass target candidate acquired by the acquiring means.

BEST MODE FOR CARRYING OUT THE INVENTION

An embodiment of the present invention will now be described in detail with reference to the drawings. A game device according to the embodiment of the present invention is realized with, for example, a consumer game device (a stationary game device), a portable game device, a portable phone, a personal digital assistant (PDA), a personal computer, or a server computer. In this description, a configuration is described in which the game device according to the embodiment of the present invention is realized using a consumer game device.

[1. Structure of Game Device]

Figure 1:
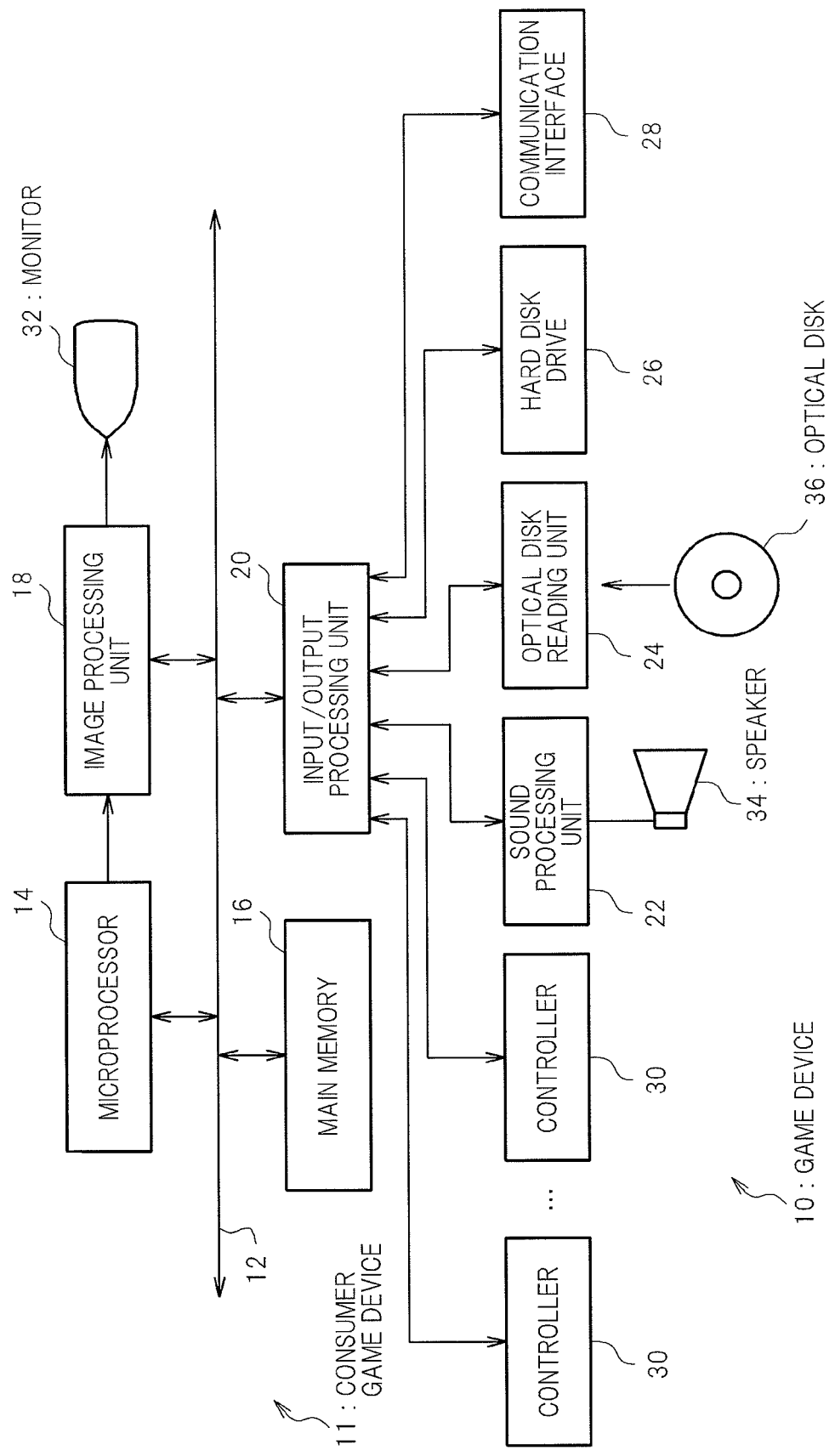
FIG. 1 is a diagram showing a hardware structure of a game device according to an embodiment of the present invention.

FIG. 1 is a diagram showing an overall structure of a game device 10 according to the embodiment of the present invention. As shown in FIG. 1, the game device 10 comprises a consumer game device 11, a monitor 32, a speaker 34, and an optical disk 36 (information storage medium). The monitor 32 and the speaker 34 are connected to the consumer game device 11. For example, a home television receiver is used as the monitor 32. For example, a speaker built into the home television receiver is used as the speaker 34.

The consumer game device 11 is a computer game system, and comprises a bus 12, a microprocessor 14, a main memory 16, an image processing unit 18, an input/output processing unit 20, a sound processing unit 22, an optical disk reading unit 24, a hard disk drive 26, a communication interface 28, and a controller 30.

The microprocessor 14 controls each section of the consumer game device 11 based on an operating system stored in a ROM (not shown) and a program which is read from the optical disk 36. The main memory 16 comprises, for example, a RAM, and a program and data which are read from the optical disk 36 are written to the main memory 16 as necessary. The main memory 16 is also used as a work memory of the microprocessor 14. The bus 12 is provided for exchanging an address and data among the sections of the consumer game device 11.

The image processing unit 18 comprises a VRAM, and draws a game screen in the VRAM based on image data which is supplied from the microprocessor 14. The game screen drawn on the VRAM is converted to a video signal, and is output to the monitor 32 at a predetermined time.

The input/output processing unit 20 is an interface for allowing the microprocessor 14 to access the sound processing unit 22, the optical disk reading unit 24, the hard disk drive 26, the communication interface 28, and the controller 30. The sound processing unit 22 comprises a sound buffer and outputs, from the speaker 34, various sound data (such as, for example, game music, game sound effects, messages, etc.) which are read from the optical disk 36 into the sound buffer. The communication interface 28 is an interface for the consumer game device 11 to connect to a communication network in a wired or wireless manner.

The optical disk reading unit 24 reads the program and data recorded on the optical disk 36. In the described configuration, the optical disk 36 is used for supplying the program and data to the consumer game device 11, but alternatively, other information storage media such as a memory card may be used. In addition, it is also possible, for example, to supply the program and data from a remote location through a communication network such as the Internet to the consumer game device 11. The hard disk drive 26 is a typical hard disk drive device (auxiliary memory device). The program and data described herein as being stored in the optical disk 36 may alternatively be stored in the hard disk drive 26.

The controller 30 is a general-purpose operation inputting unit for allowing a user to input various game operations. A plurality of controllers 30 may be connected to the consumer game device 11. The input/output processing unit 20 scans the operation state of the controller 30 at every predetermined period (for example, every $\frac{1}{60}^{th}$ of a second), and sends an operation signal indicating the scan result to the microprocessor 14 via the bus 12. The microprocessor 14 determines the game operation of the user based on the operation signal. The controller 30 may be connected to the consumer game device 11 in a wired or wireless manner.

In the game device 10, for example, a soccer game simulating a soccer match between team A and team B is executed. In the following description, an example case is described in which the team A is operated by the user and the team B is operated by the computer. The team B may alternatively be operated by another user.

[2. Virtual Three-Dimensional Space]

Figure 2:
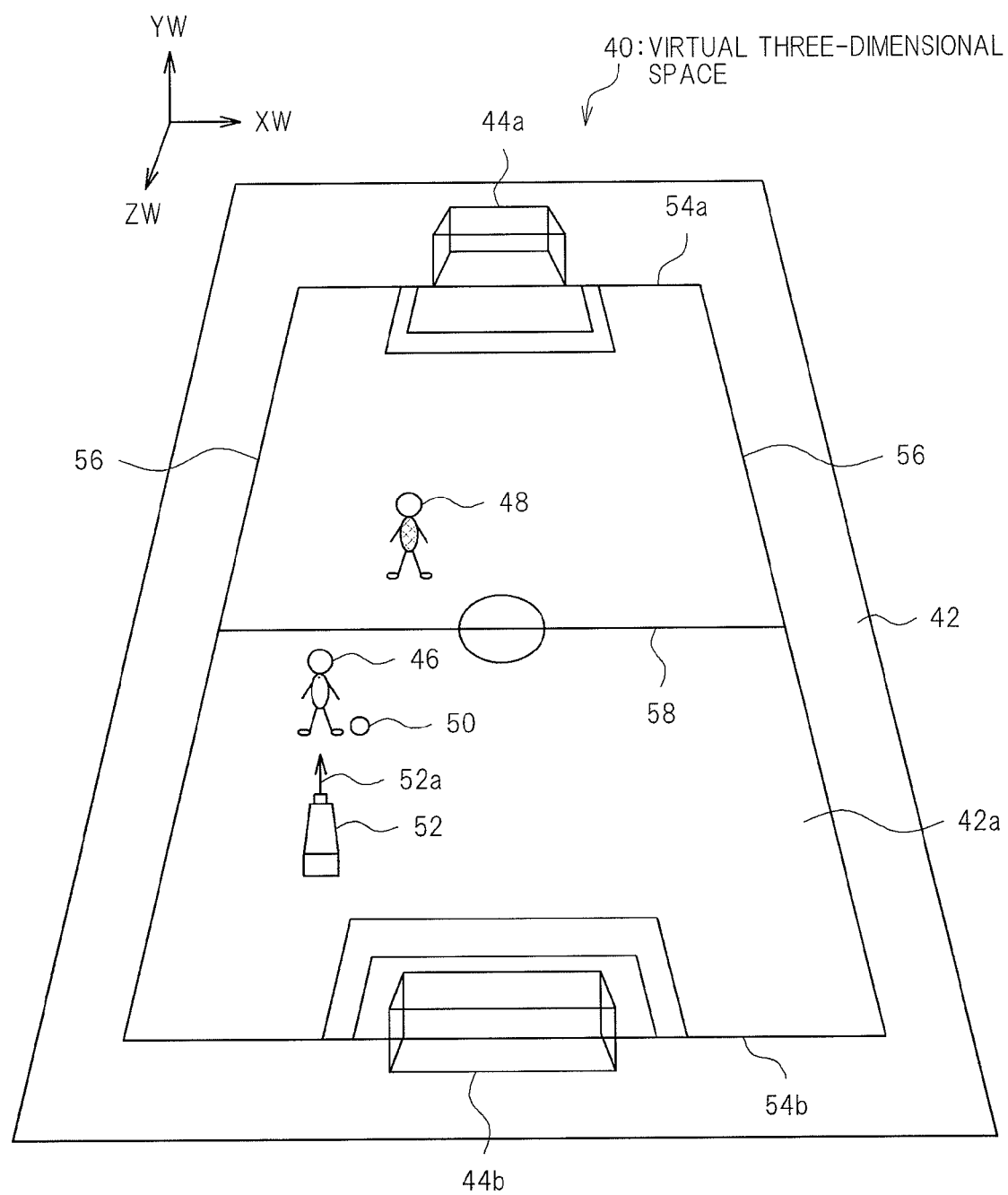
FIG. 2 is a diagram showing an example of a virtual three-dimensional space.

In the game device 10, a virtual three-dimensional space is constructed in the main memory 16 in order to create a game screen. FIG. 2 shows an example of the virtual three-dimensional space. As shown in FIG. 2, a field 42 which is an object representing a soccer field is placed in the virtual three-dimensional space 40. In the field 42, for example, goal lines 54a and 54b, touch lines 56, a center line 58, etc. are represented. In the following description, an area 42a surrounded by the goal lines 54a and 54b, and the touch lines 56 will be described as a "pitch".

Goal objects 44a and 44b which are objects representing soccer goals, player characters 46 and 48 which are objects representing soccer players, and a ball 50 which is an object representing a soccer ball are placed on the field 42. The goal 44a is a goal corresponding to the team A and the goal 44b is a goal corresponding to the team B. If the ball 50 moves into the goal 44b, a scoring event for the team A occurs, and if the ball 40 moves into the goal 44a, a scoring event for the team B occurs. The player character 46 is a player character belonging to the team A and the player character 48 is a player character belonging to the team B. Although not shown in FIG. 2, eleven player characters 46 belonging to the team A and eleven player characters 48 belonging to the team B are placed on the field 42.

One of eleven player characters belonging to the team A is set as an operation target of the user. The player character 46 which is the operation target of the user acts according to the operation of the user. The other player characters 46 belonging to the team A act according to the operation of the computer. The eleven player characters 48 belonging to the team B also act according to the operation of the computer.

If the player character 46 (or the player character 48) and the ball 50 come close to each other, the player character 46 (or the player character 48) and the ball 50 are correlated to each other under a predetermined condition. In this case, the ball 50 moves according to movement of the player character 46 (or the player character 48). This scene is represented as a dribbling action of the player character 46 (or the player character 48). The state where the ball 50 is correlated to the player character 46 (or the player character 48) will hereinafter be called a state where "the player character 46 (or the player character 48) is in possession of the ball 50".

In addition, in the state where a certain player character 46 (or certain player character 48) is in possession of the ball 50, if another player character 48 (or another player character 46) comes close to the ball 50, the other player character 48 (or the other player character 46) and the ball 50 are correlated to each other under a predetermined condition. In this manner, the ball 50 which was in possession of the player character 46 (or the player character 48) is taken by the other player character 48 (or the other player character 46).

A virtual camera 52 (point of view) is set in the virtual three-dimensional space 40. A game screen representing a scene of the virtual three-dimensional space 40 viewed from the virtual camera 52 is displayed on the monitor 32. For example, in order to constantly display the player character 46 operated by the user on the game screen, the position of the virtual camera 52 is controlled based on a change of a position of the player character 46 operated by the user. Alternatively, in order to constantly display the ball 50 on the game screen, the position of the virtual camera 52 may be controlled based on a change of a position of the ball 50. In the following description, a case is considered in which the position of the virtual camera 52 is controlled based on the change of the position of the player character 46 operated by the user.

[3. Game Screen]

Figure 3:
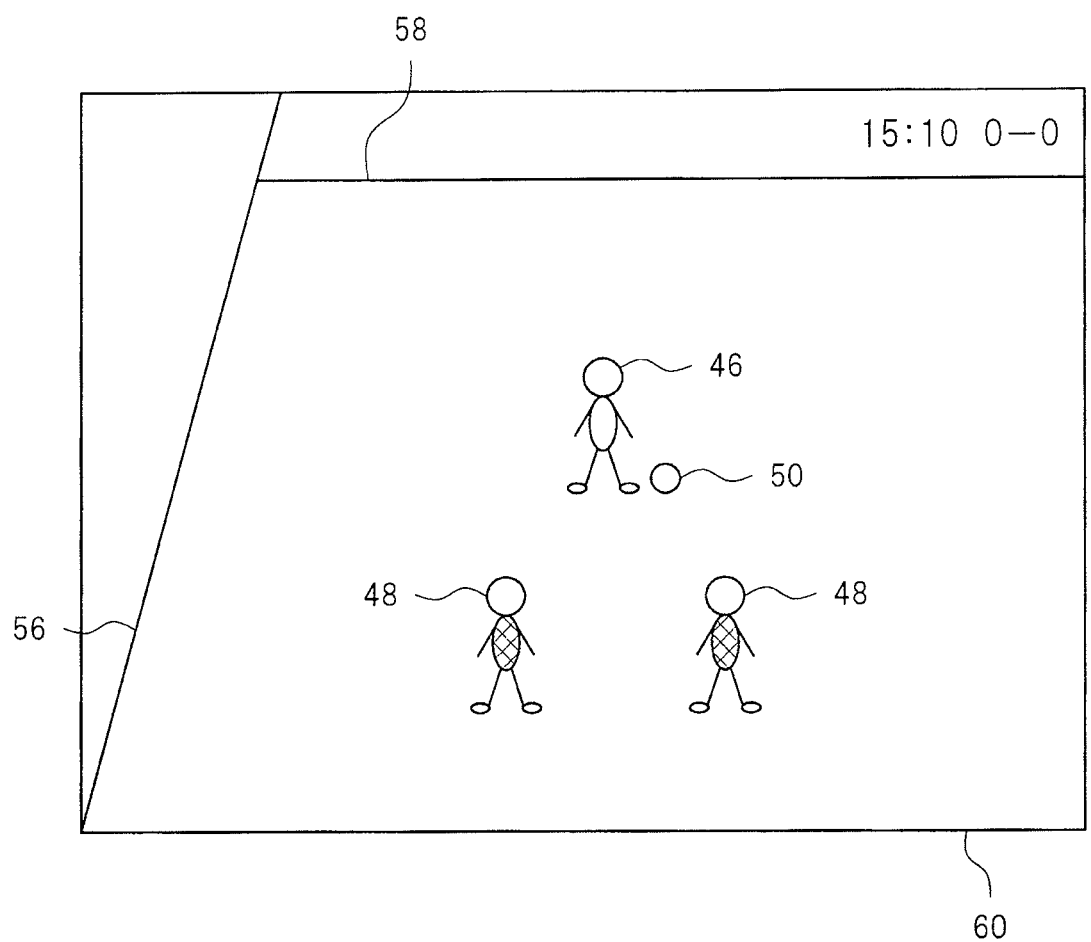
FIG. 3 is a diagram showing an example of a game screen.

FIG. 3 shows an example of the game screen. As shown in FIG. 3, only a partial area of the virtual three-dimensional space 40 is displayed on the game screen 60. More specifically, an area included in a field of view of the virtual camera 52 of the virtual three-dimensional space 40 is displayed on the game screen 60.

[4. Movement Destination Candidate/Pass Target Candidate Guidance Function]

As described above, only a partial area of the virtual three-dimensional space 40 is displayed on the game screen 60. Because of this, if a player character 46 suitable as a pass partner and an area suitable as a movement destination exist in an area which is not displayed on the game screen 60, it is difficult for the user to know that they exist.

Figure 4:
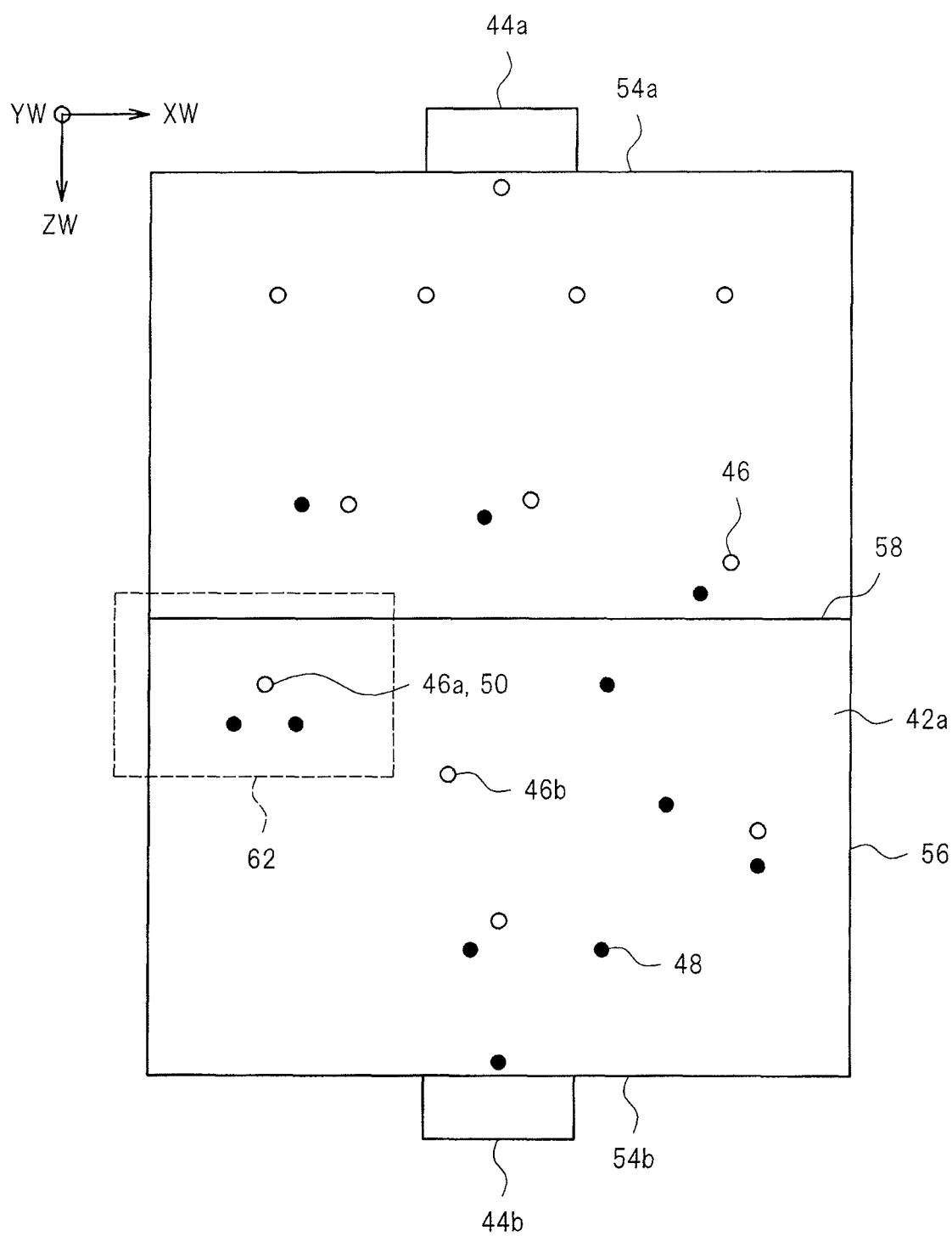
FIG. 4 is a diagram showing an example of a positional situation of the player character.

FIG. 4 is a diagram showing an example of a positional situation of the player characters 46 and 48. In FIG. 4, a position of the player character 46 belonging to the team A is shown with a white circle and a position of the player character 48 belonging to the team B is shown with a black circle. Reference numeral 46*a* represents the player character 46 operated by the user, among the player characters 46 belonging to the team A. Reference numeral 46*b* shows a player character 46 which is free, among the player characters 46 belonging to the team A. Reference numeral 62 represents an area displayed on the game screen 60. In FIG. 4, the player character 46*a* operated by the user is in possession of the ball 50.

In the state shown in FIG. 4, there is a player character 46*b* which is free. Therefore, the user can advantageously proceed with offence by instructing the player character 46*a* to pass to the player character 46*b*. Thus, the player character 46*b* which is free can be considered to be a player character suitable as a pass partner. However, the player character 46*b* is not positioned in the area 62 displayed on the game screen 60, and is not displayed on the game screen 60. Because of this, it is difficult for the user to know of the existence of the player character 46*b* which is free.

Figure 5:
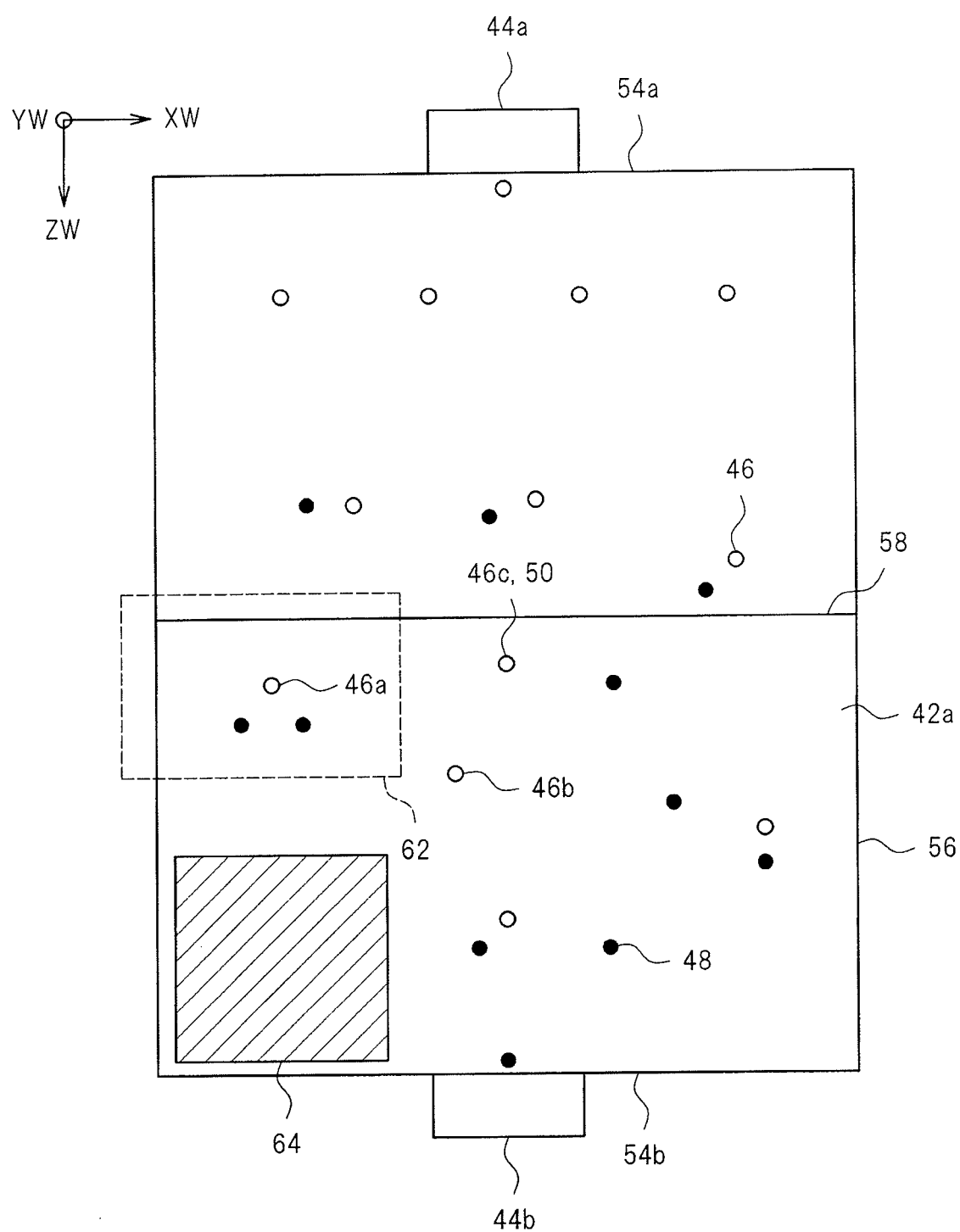
FIG. 5 is a diagram showing an example of a positional situation of the player character.

FIG. 5 is a diagram also showing an example of a positional situation of the player characters 46 and 48. Reference numeral 46*c* represents a player character 46 which is in possession of the ball 50, among the player characters 46 belonging to the team A. Reference numeral 64 represents an open space.

In the state shown in FIG. 5, there is the open space 64. The user may be able to advantageously proceed with offence by moving the player character 46*a* to the open space 64. This is because if the ball is passed from the player character 46*c* to the player character 46*a* after the player character 46*a* moves to the open space 64, the player character 46*a* can move freely without being interfered with by the player character 48 belonging to the team B. Thus, the open space 64 can be considered to be an area suitable as a movement destination of the player character 46*a*. However, the open space 64 is not included in the area 62 displayed on the game screen 60, and is not displayed on the game screen 60. Therefore, it is difficult for the user to know of the existence of the open space 64.

In consideration of this, the game device 10 has a function to assist the user to relatively easily know, for example, the player character 46*b* which is free as shown in FIG. 4 or the open space 64 as shown in FIG. 5.

More specifically, in the game device 10, as a control mode of the virtual camera 52, a normal mode and a guidance mode are provided. Of these modes, the guidance mode is a mode for controlling the state of the virtual camera 52 so as to show the user that the player character 46 which is free or the open space exist.

Figure 6:
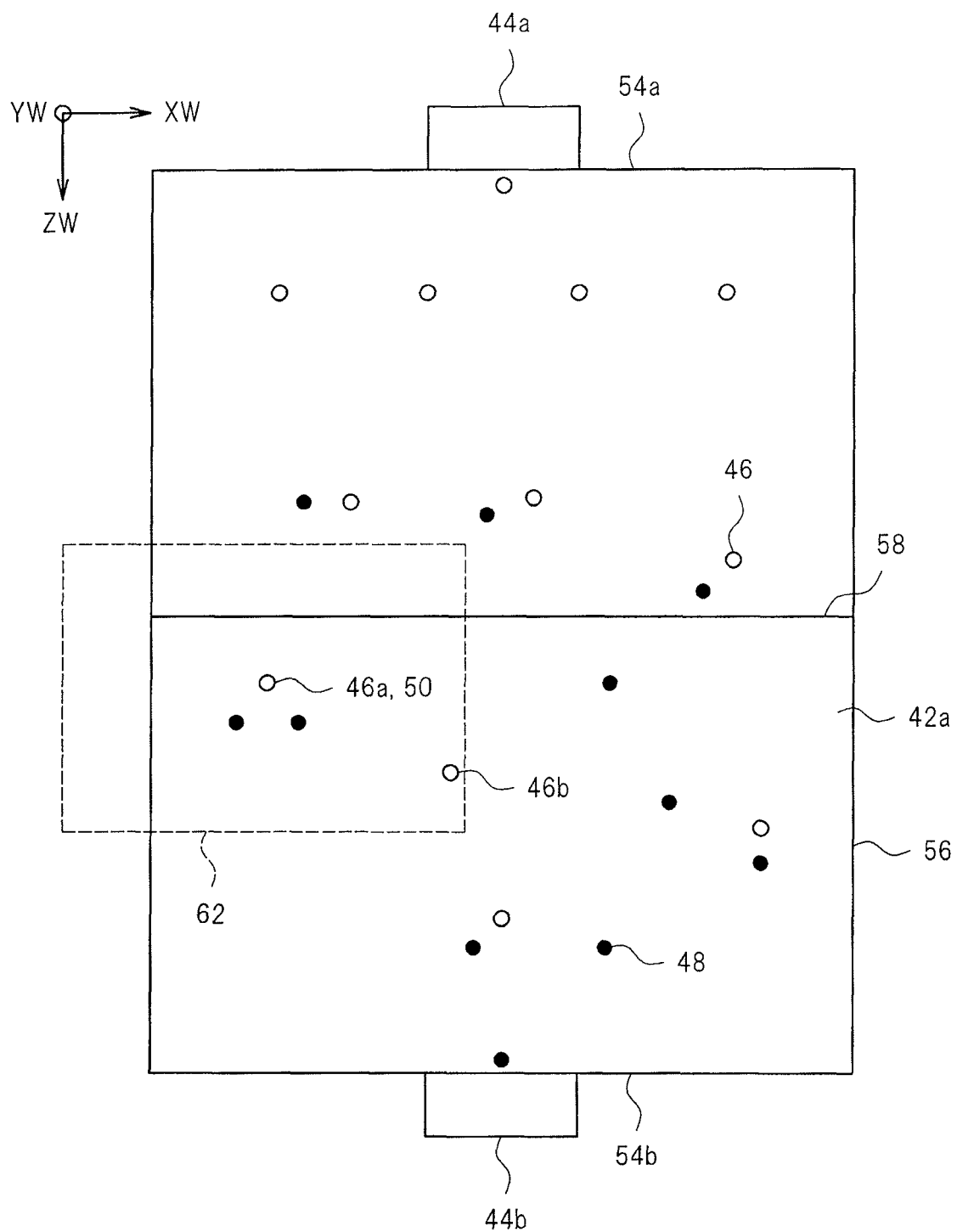
FIG. 6 is a diagram for explaining an example of control of a virtual camera in a guidance mode.
Figure 7:
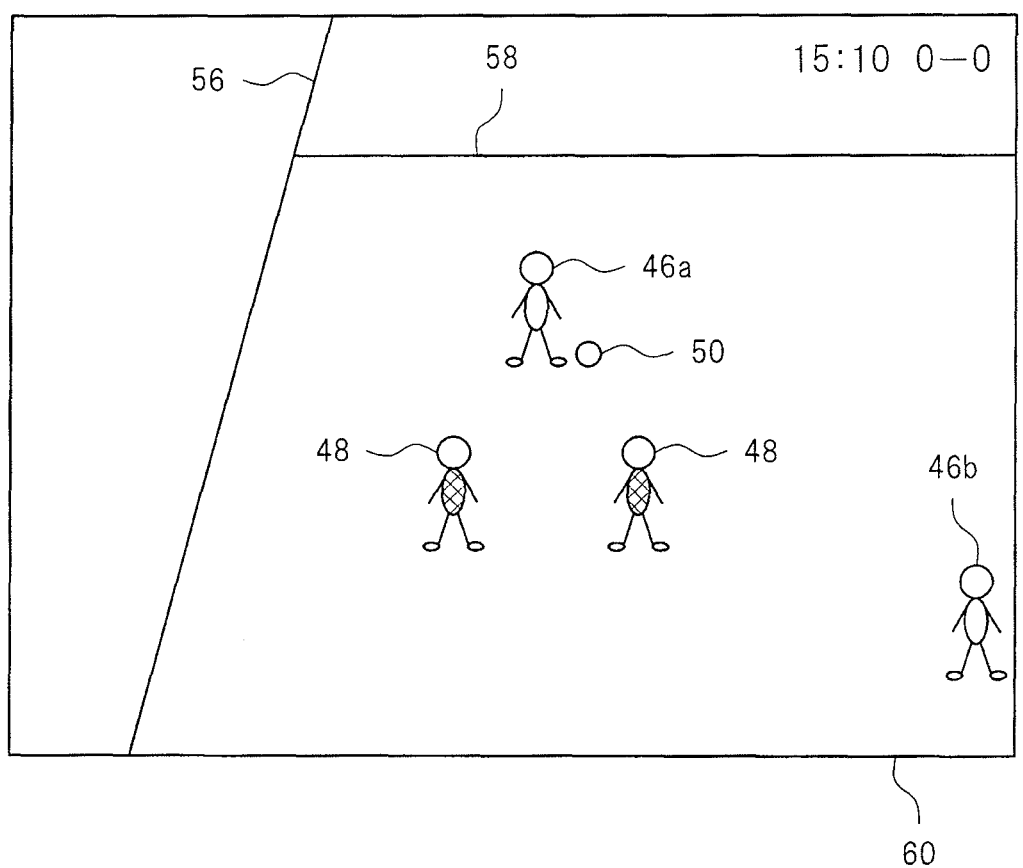
FIG. 7 is a diagram showing an example of a game screen in the guidance mode.
Figure 8:
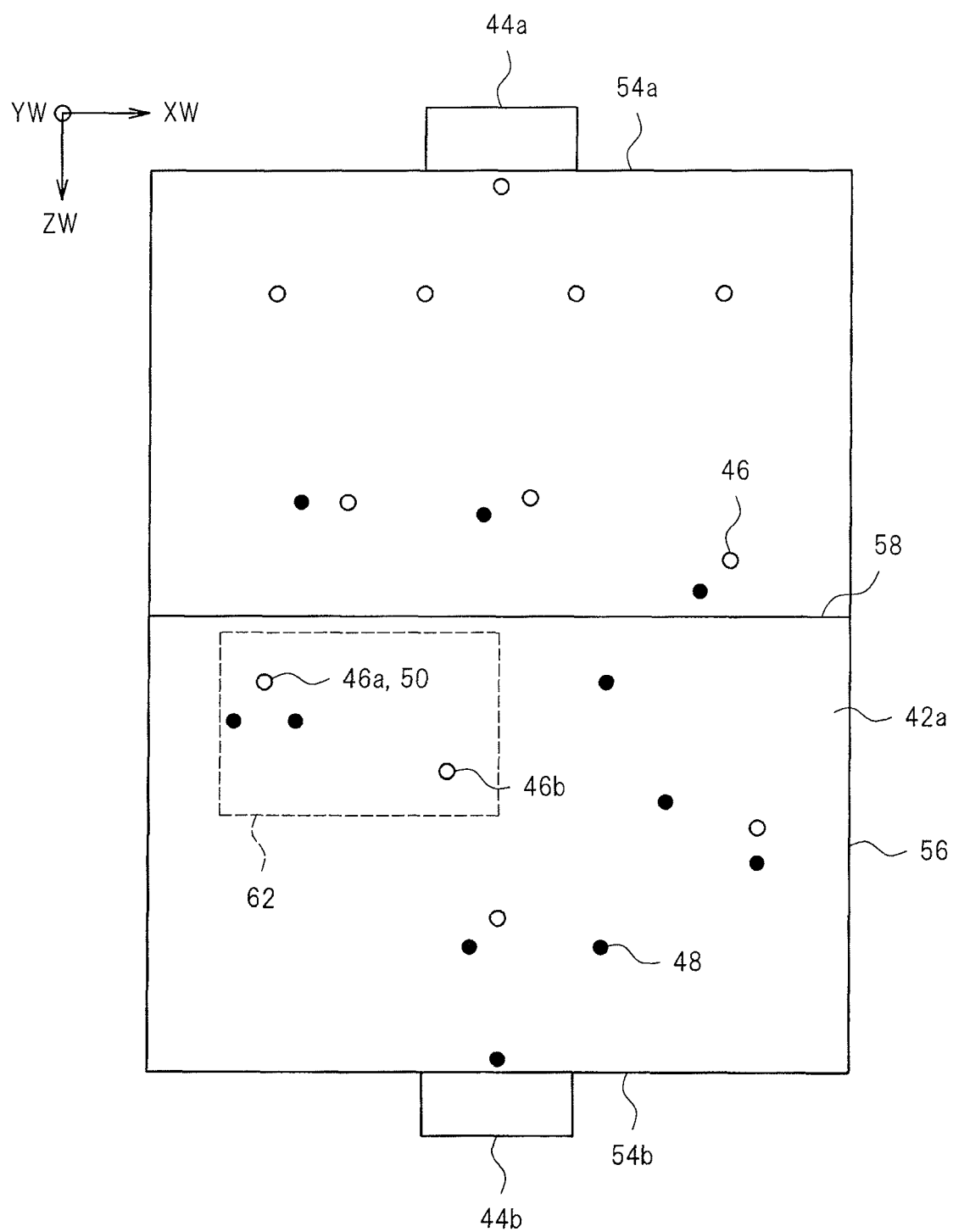
FIG. 8 is a diagram for explaining another example of control of a virtual camera in the guidance mode.
Figure 9:
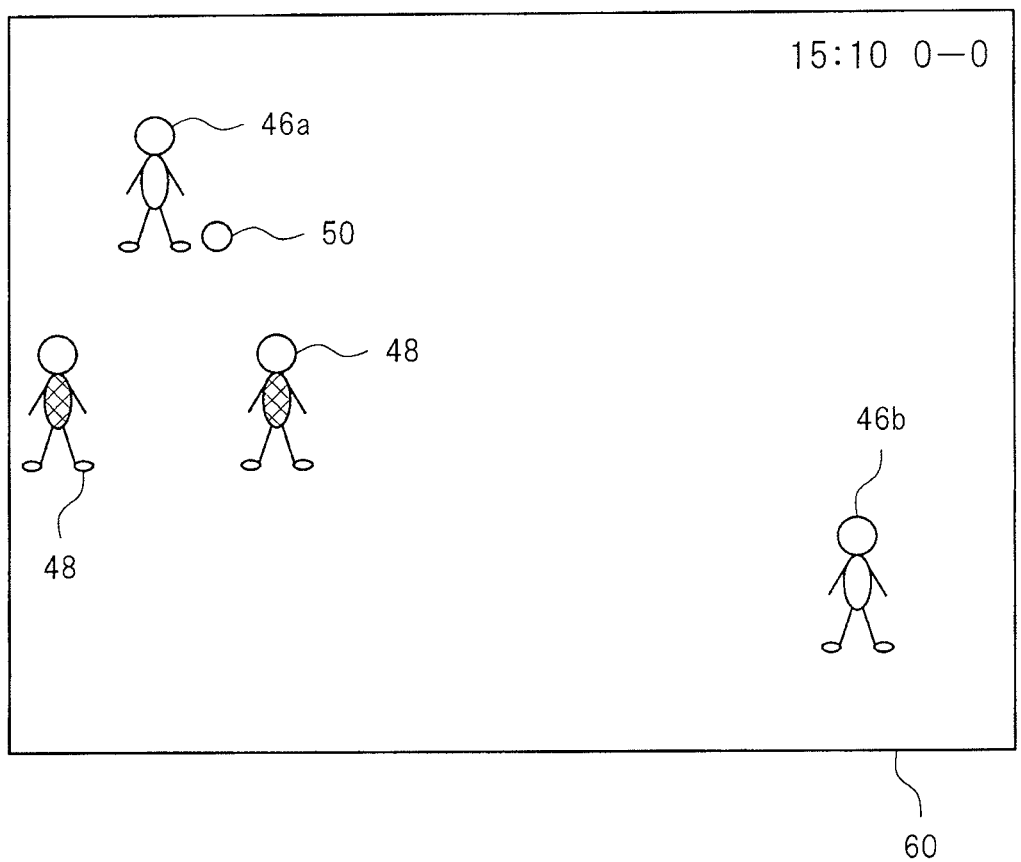
FIG. 9 is a diagram showing another example of a game screen in the guidance mode.

Control of the virtual camera 52 in the guidance mode will now be described. FIG. 6 is a diagram for explaining an example control of the virtual camera 52 in the guidance mode, and FIG. 7 shows an example of the game screen 60 in a case where the control of the virtual camera 52 as shown in FIG. 6 is executed. FIG. 8 is a diagram for explaining another example control of the virtual camera 52 in the guidance mode, and FIG. 9 shows an example of the game screen 60 in a case where the control of the virtual camera 52 as shown in FIG. 8 is executed.

Here, a case is considered in which the user is guided with the existence of the player character 46*b* which is free as shown in FIG. 4. In the guidance mode in this case, the virtual camera 52 is controlled so that both the player character 46*a* operated by the user and the player character 46*b* which is free are displayed on the game screen 60.

More specifically, for example, the state of the virtual camera 52 is controlled so that the size of the area 62 displayed on the game screen 60 is broadened as shown in FIG. 6. As a result, the player character 46*b* is positioned in the area 62 displayed on the game screen 60. That is, the player character 46*b* is displayed on the game screen 60 as shown in FIG. 7, and the user can relatively easily know of the existence of the player character 46*b* which is free.

Alternatively, for example, the state of the virtual camera 52 is controlled so that the area 62 displayed on the game screen 60 is moved, as shown in FIG. 8. As a result, the player character 46*b* is positioned within the area 62 displayed on the game screen 60. That is, the player character 46*b* is displayed on the game screen 60 as shown in FIG. 9, and the user can relatively easily know of the existence of the player character 46*b* which is free.

Here, a case is exemplified in which the user is guided with the existence of the player character 46*b* which is free as shown in FIG. 4. Similar guidance may be applied in a case where the user is guided with the existence of the open space 64 as shown in FIG. 5. In the guidance mode of this case, the virtual camera 52 is controlled so that both the player character 46*a* operated by the user and the open space 64 are displayed on the game screen 60.

With the guidance mode as described above, for example, the user can relatively easily know of the player character 46*b* which is free as shown in FIG. 4 or the open space 64 as shown in FIG. 5.

[5. Functional Block]

Figure 10:
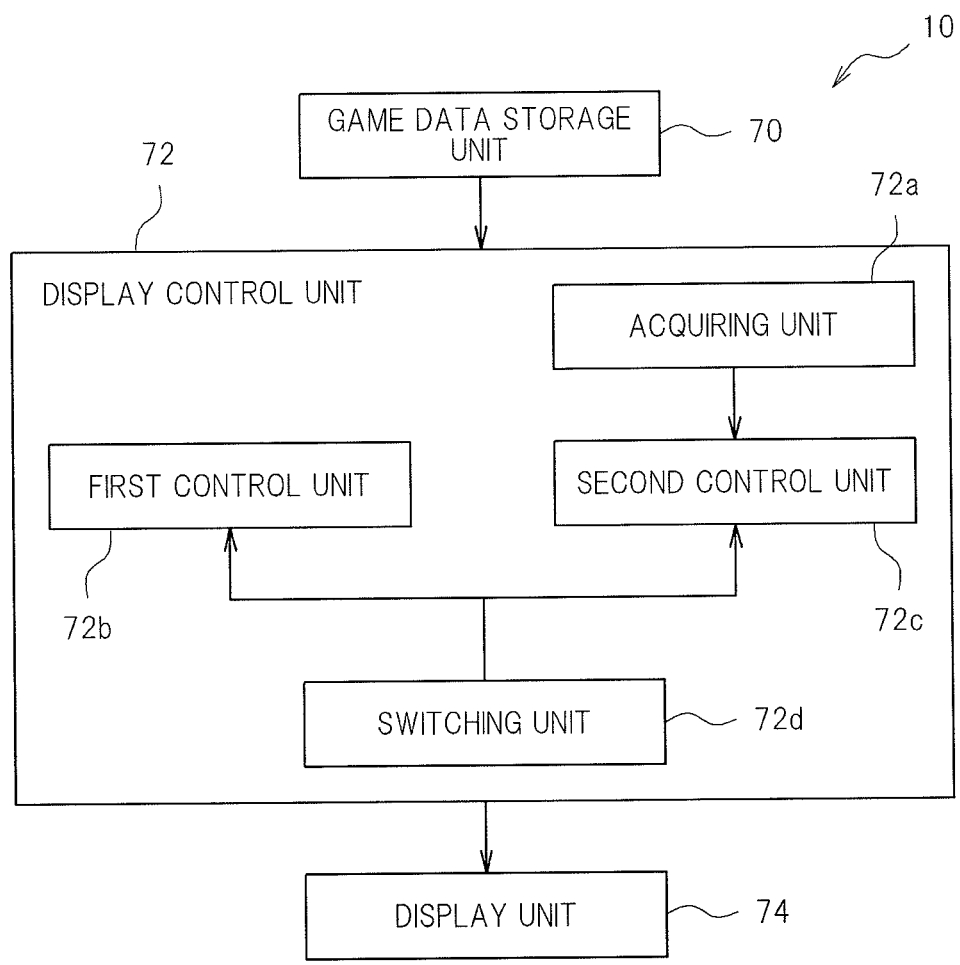
FIG. 10 is a functional block diagram of the game device.

Structures related to the movement destination candidate/pass target candidate guidance function will now be described. FIG. 10 is a functional block diagram mainly showing functional blocks related to the movement destination candidate/pass target candidate guidance function. As shown in FIG. 10, the game device 10 comprises a game data storage unit 70, a display control unit 72, and a display unit 74. The game data storage unit 70 is realized mainly with, for example, the main memory 16 and the optical disk 36. The display control unit 72 is realized mainly with, for example, the microprocessor 14 and the image processing unit 18. The display unit 74 is realized mainly with, for example, the monitor 32.

[5-1. Game Data Storage Unit]

The game data storage unit 70 stores data for executing the soccer game. More specifically, data indicating a current game situation is stored in the game data storage unit 70. For example, the below-described data are stored:

(1) data indicating current states (for example, position, orientation, movement direction, etc.) of the player characters 46 and 48;

(2) data indicating current states (for example, position, movement direction, etc.) of the ball 50;

(3) data indicating current states (position, direction of view, angle of view, etc.) of the virtual camera 52;

(4) data indicating the player character 46 operated by the user;

(5) data indicating the player character 46 or 48 which is in possession of the ball 50;

(6) data indicating the match status (for example, score status of both teams, etc.); and (7) data indicating elapsed time.

[5-2. Display Control Unit and Display Unit]

The display control unit 72 displays the game screen 60 representing a scene of the virtual three-dimensional space 40 viewed from the virtual camera 52 on the display unit 74. The display control unit 72 comprises an acquiring unit 72a, a first control unit 72b, a second control unit 72c, and a switching unit 72d.

[5-2-1. Acquiring Unit]

The acquiring unit 72a acquires, in a case where the team A is in possession of the ball 50, a movement destination candidate or a pass target candidate of the player character 46 belonging to the team A based on the position of the player character 48 belonging to the team B. For example, a position of the player character 46b which is free as shown in FIG. 4 is acquired as the pass target candidate. For example, a position of the open space 64 as shown in FIG. 5 is acquired as the movement destination candidate.

[5-2-2. First Control Unit]

The first control unit 72b corresponds to the normal mode. The first control unit 72b controls the area 62 displayed on the game screen 60 based on the position of the reference player character or the ball 50. For example, the first control unit 72b controls the state (such as, for example, the position, the direction of view, or the angle of view) of the virtual camera 52. As a result, the area 62 displayed on the game screen 60 is controlled.

The "reference player character" is a player character selected from among the player characters 46 belonging to the team A and the player characters 48 belonging to the team B. For example, the "reference player character" is the player character 46 operated by the user or the player character 46 or 48 which is in possession of the ball 50. In this description, a configuration is considered in which the "reference player character" is the player character 46 operated by the user.

In the present embodiment, in order to constantly display the player character 46 operated by the user on the game screen 60, the first control unit 72b controls the state of the virtual camera 52 based on the position of the player character 46 operated by the user. The details will be described later (with reference to FIG. 13). The first control unit 72b may alternatively control the state of the virtual camera 52 based on the position of the ball 50. In this manner, a configuration may be employed in which the ball 50 is constantly displayed on the game screen 60.

[5-2-3. Second Control Unit]

The second control unit 72c corresponds to the guidance mode. The second control unit 72c controls the area 62 displayed on the game screen 60 based on the position of the reference player character or the position of the ball 50, and the movement destination candidate or the pass target candidate acquired by the acquiring unit 72a. For example, the second control unit 72c controls the state (such as, for example, position, viewing direction, angle of view, or the like) of the virtual camera 52. As a result, the area 62 displayed on the game screen 60 is controlled.

In this description also, a case is considered in which the "reference player character" is the player character 46 operated by the user. In the present embodiment, the second control unit 72c controls the state of the virtual camera 52 based on the position of the player character 46 operated by the user and the movement destination candidate or the pass target candidate acquired by the acquiring unit 72a. More specifically, the state of the virtual camera 52 is controlled so that both the position of the player character 46 operated by the user and the movement destination candidate or the pass target candidate acquired by the acquiring unit 72a are displayed on the game screen 60. The details will be described later (with reference to FIGS. 14 and 16).

The second control unit 72c may alternatively control the state of the virtual camera 52 based on the position of the ball 50 and the movement destination candidate or the pass target candidate acquired by the acquiring unit 72a. In this manner, a configuration may be employed in which both the ball 50 and the movement destination candidate or the pass target candidate acquired by the acquiring unit 72a are displayed on the game screen 60.

[5-2-4. Switching Unit]

The switching unit 72d switches the control mode of the virtual camera 52 between the normal mode and the guidance mode. That is, the switching unit 72d switches between a state where the control is executed by the first control unit 72b and a state where the control is executed by the second control unit 72c.

For example, as a default, the switching unit 72d sets the control mode of the virtual camera 52 to the normal mode. If a first predetermined condition is satisfied, the switching unit 72d switches the control mode of the virtual camera 52 from the normal mode to the guidance mode. In addition, if a second predetermined condition is satisfied after the switching unit 72d has executed the switching from the normal mode to the guidance mode, the switching unit 72d switches the control mode of the virtual camera 52 from the guidance mode to the normal mode.

The "first predetermined condition" may be, for example, a condition of whether or not a player character 46 is found which is free and which is not displayed on the game screen 60 in the normal mode. Alternatively, the "first predetermined condition" may be, for example, a condition of whether or not an open space is found which is not displayed on the game screen 60 in the normal mode. The "second predetermined condition" may be, for example, a condition of whether or not an elapsed time after the execution of the switching from the normal mode to the guidance mode has reached a predetermined time period.

The "first predetermined condition" may include a condition of whether or not a value of an ability parameter of the reference player character (for example, the player character 46 operated by the user) is greater than or equal to a reference value. In other words, a configuration may be employed in which the switching from the normal mode to the guidance mode is executed only if the value of the ability parameter of the reference player character is greater than or equal to the reference value, and the player character 46 which is free or the open space is found which is not displayed on the game screen 60 in the normal mode. The ability parameter is, for example, a parameter indicating a level of an ability to find the player character 46 which is free or the open space.

Alternatively, it is also possible to employ a configuration in which, rather than the control mode being always switched from the normal mode to the guidance mode if the "first predetermined condition" is satisfied, the control mode is switched from the normal mode to the guidance mode based on a given probability. The probability may change according to the current match status. The match status is information indicating whether or not the team A is advantageous over the team B, and may be, for example, scoring status, number of shots, or number of corner kicks. If the above-described probability is to be changed according to the current match status, probability data in which the condition related to the match status and the probability are correlated is stored. A probability correlated to the condition satisfied by the current match status is used. For example, in the probability data, a probability when the score of the team A is higher than the score of the team B is set to a first probability, and a probability when the score of the team A is lower than the score of the team B is set to a second probability which is higher than the first probability. By employing such a configuration, it is possible to achieve a state where, when the team A has a disadvantage compared to the team B, the control mode of the virtual camera 52 is switched to the guidance mode more easily than the case when the team A has an advantage over the team B.

[6. Process Executed by Game Device]

Figure 11:
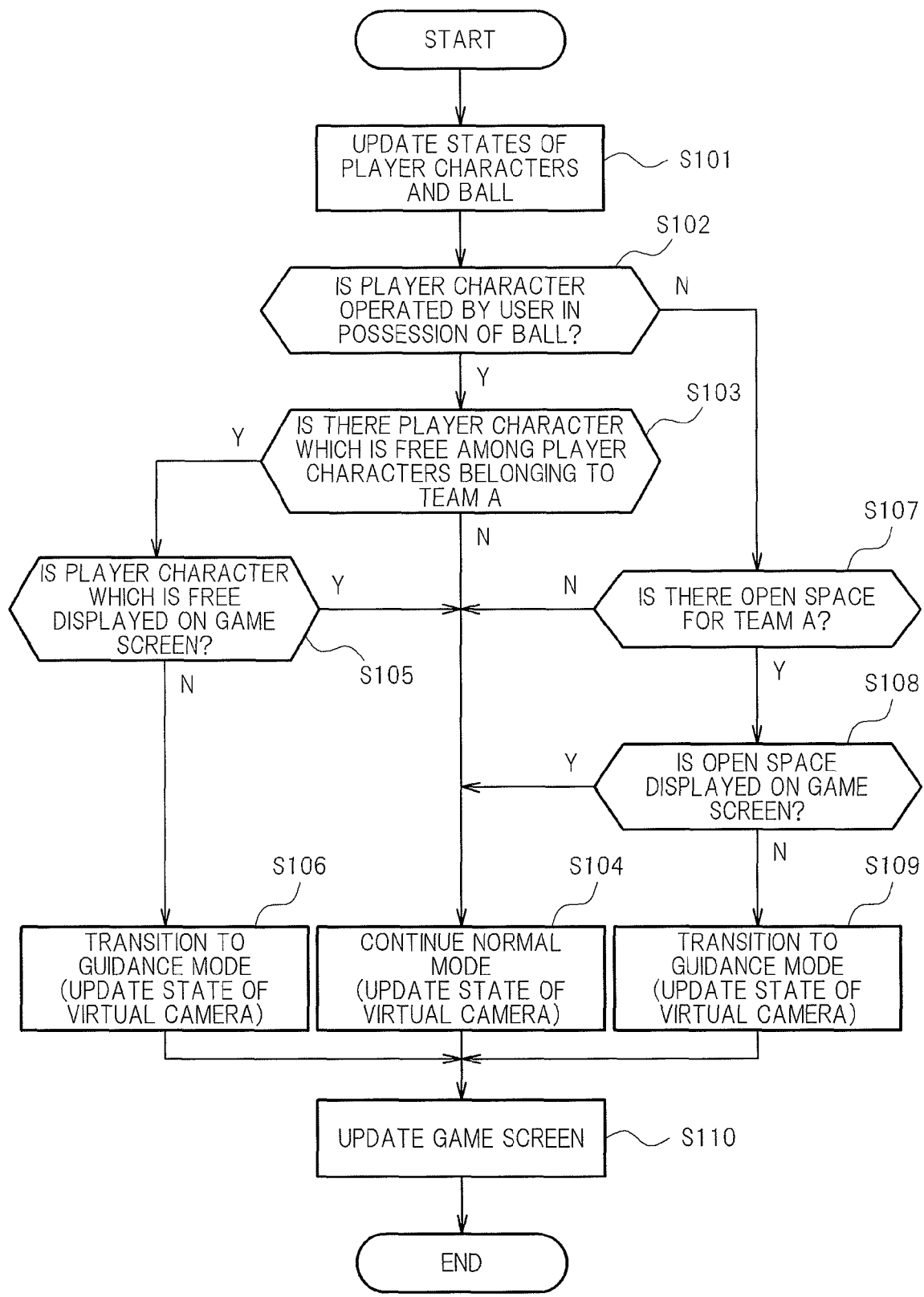
FIG. 11 is a flowchart showing a process executed by the game device.

Next, a process executed by the game device 10 will be described. FIG. 11 is a flowchart mainly showing the process related to the present invention, among the processes executed by the game device 10. More specifically, FIG. 11 shows a process periodically executed at every predetermined time period (for example, every $\frac{1}{60}^{th}$ of a second) in a case where the control mode of the virtual camera 52 is set to the normal mode and the player character 46 belonging to the team A is in possession of the ball 50. The microprocessor 14 executes the process shown in FIG. 11 according to a program stored in the optical disk 36. With the execution of the process shown in FIG. 11, the display control unit 72 is realized.

As shown in FIG. 11, the microprocessor 14 first updates the states of the player characters 46 and 48 and the ball 50 (S101). For example, the state (such as, for example, position and orientation) of the player character 46 operated by the user, among the player characters 46 belonging to the team A is updated based on the user's operation, and the states of the other player characters 46 are updated based on a predetermined algorithm. Similarly, the states of the player characters 48 belonging to the team B are also updated based on a predetermined algorithm. Moreover, the state (such as, for example, position and movement direction) of the ball 50 is updated. The data indicating the player character 46 operated by the user, data indicating the player character 46 or 48 which is in possession of the ball 50, data indicating the match status, and data indicating the elapsed time are also updated.

Then, the microprocessor 14 judges whether or not the player character 46 operated by the user is in possession of the ball 50 (S102).

If the player character 46 operated by the user is in possession of the ball 50, the microprocessor 14 (acquiring unit 72a) judges whether or not there is a player character 46 which is free among the player characters 46 belonging to the team A (S103).

Figure 12:
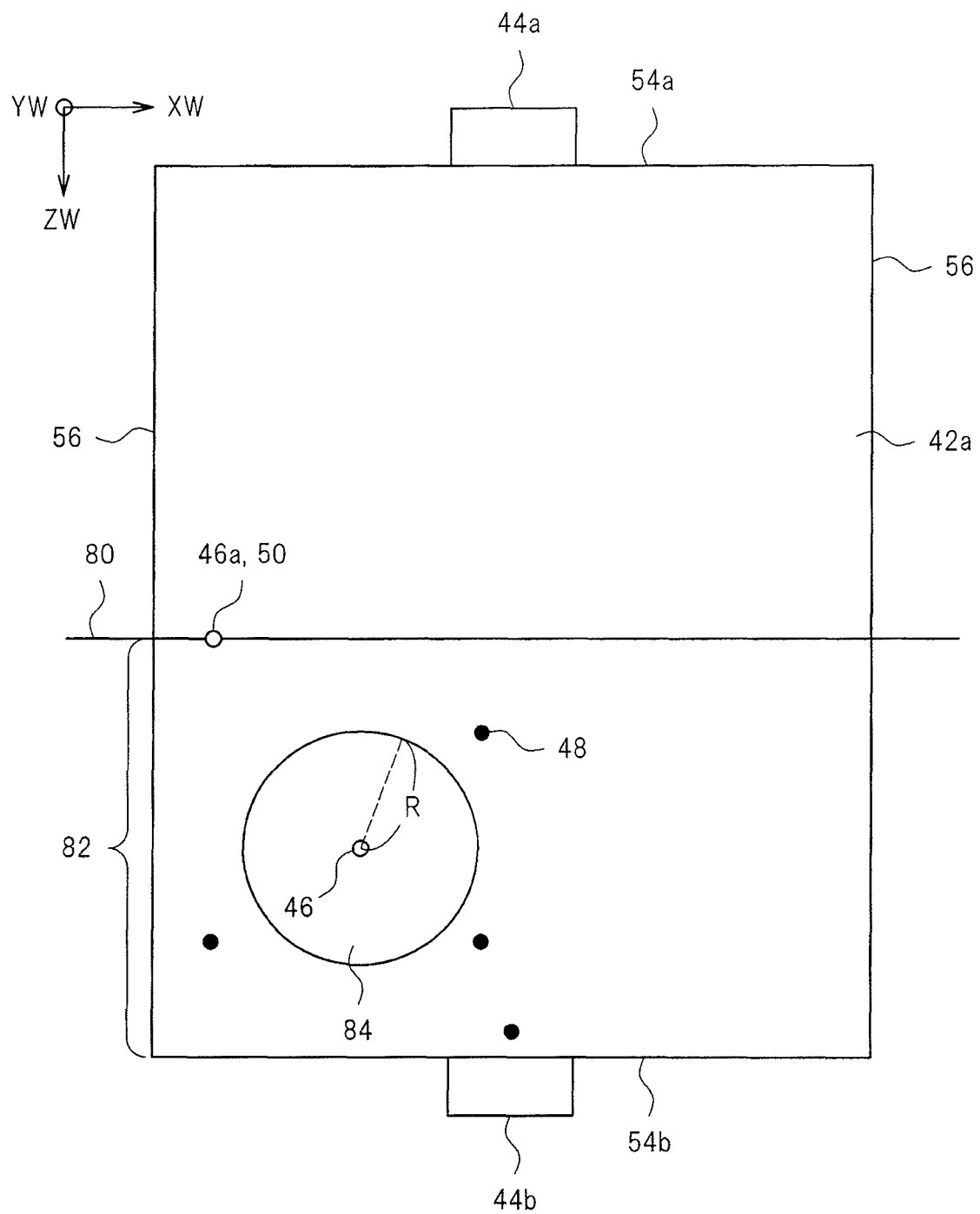
FIG. 12 is a diagram for explaining a process for finding a player character which is free among the first team.

In the process of S103, it is judged whether or not there is a player character 46 which satisfies both of the below-described conditions (A1) and (A2) among the player characters 46 belonging to the team A (other than the player character 46 operated by the user). FIG. 12 is a diagram for explaining the below-described conditions (A1) and (A2).

(A1) The current position of the player character 46 is within a search target area 82.

(A2) No player character 48 belonging to the teamB is positioned in an area 84 determined based on the current position of the player character 46.

The "search target area 82" is an area between a straight line 80 indicating a ZW-axis coordinate value of the player character 46a operated by the user (or the ball 50) and the goal line 54b on the side of the goal 44b of the team B, as shown in FIG. 12. The "area 84 determined based on the current position of the player character 46" is an area in which a distance from the current position of the player character 46 is less than or equal to a reference distance R.

If there is a player character 46 which satisfies both conditions (A1) and (A2), the player character 46 is judged as a player character 46 which is free. In other words, it is judged that there is a player character 46 which is free. If there are a plurality of player characters 46 which satisfy both conditions (A1) and (A2), one of these player characters 46 is selected. For example, among these player characters 46, a player character 46 which is positioned closer to the goal line 54b than the player character 46a operated by the user (or the ball 50), and which is furthest from the player character 46a operated by the user (or the ball 50) is selected.

If it is judged in S103 that there is no player character 46 which is free, the microprocessor 14 (switching unit 72d and first control unit 72b) updates the state of the virtual camera 52 without changing the control mode of the virtual camera 52 from the normal mode to the guidance mode (S104).

Figure 13:
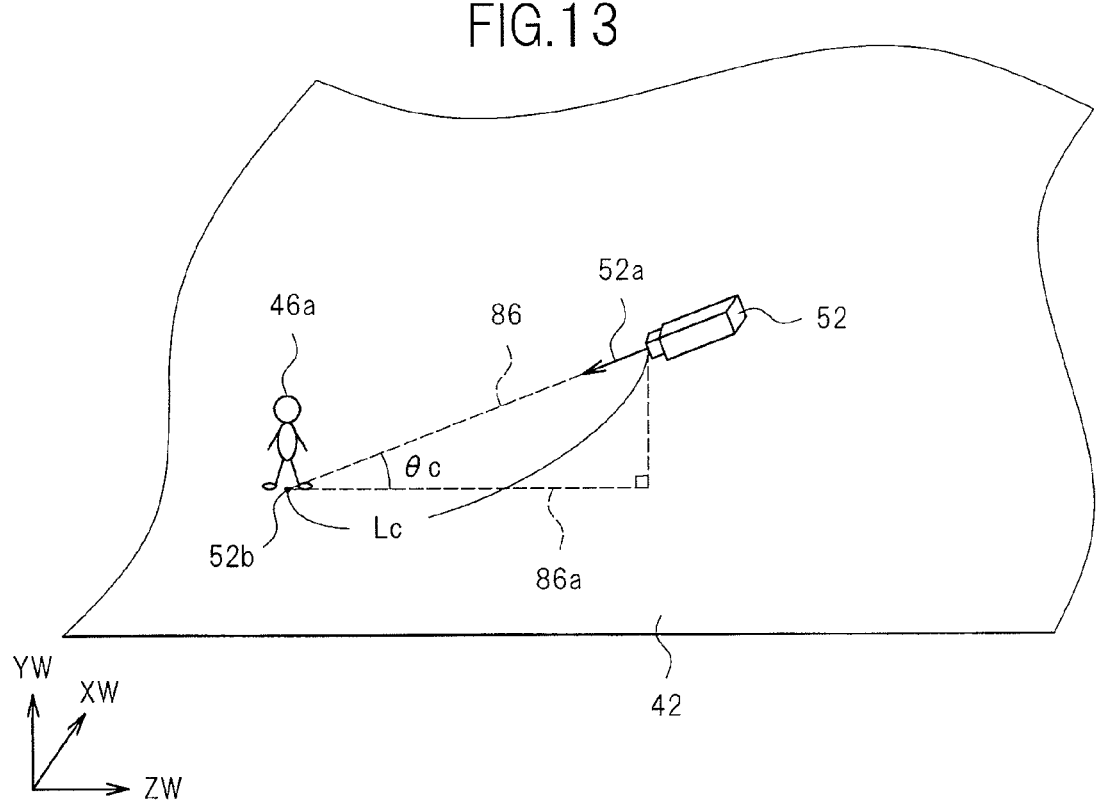
FIG. 13 is a diagram for explaining an example of control of a virtual camera in a normal mode.

In S104, the position and viewing direction of the virtual camera 52 is set in a manner as described below. FIG. 13 is a diagram for explaining an example control of the position and viewing direction of the virtual camera 52 in this case. As shown in FIG. 13, in this case, a point of gaze (a point of regard) 52b of the virtual camera 52 is set at the position of the player character 46a operated by the user. In addition, an angle $\theta c$ between a straight line 86 from the point of gaze 52b to the virtual camera 52 and the field 42 (XW-ZW plane) is set to a predetermined angle. Moreover, a distance Lc between the virtual camera 52 and the point of gaze 52b is set to a predetermined distance. Furthermore, the position and the viewing direction 52a of the virtual camera 52 are set such that a straight line 86a obtained by projecting the straight line 86 on the field 42 matches the ZW-axis direction.

If, on the other hand, it is judged in S103 that there is a player character 46 which is free, the microprocessor 14 (switching unit 72d) judges whether or not the player character 46 which is free is being displayed on the game screen 60 (S105). If it is judged that the player character 46 which is free is being displayed on the game screen 60, the control mode of the virtual camera 52 is not transitioned to the guidance mode, and continues in the normal mode (S104). Alternatively, the control mode of the virtual camera 52 may be transitioned to the guidance mode even if the player character 46 which is free is being displayed on the game screen 60. By transitioning the control mode of the virtual camera 52 to the guidance mode even if the player character 46 which is free is displayed on the game screen 60, the position of the virtual camera 52 may be changed, which may facilitate the user recognizing the player character 46 which is free.

Figure 14:
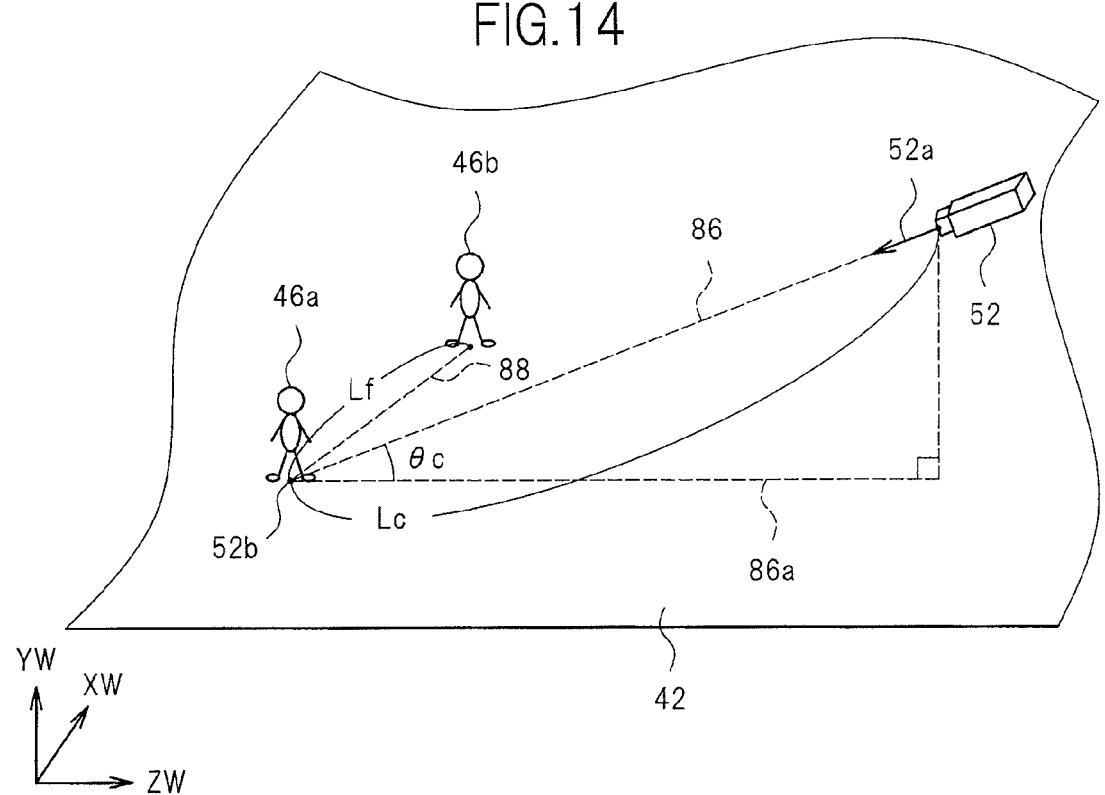
FIG. 14 is a diagram for explaining an example of control of a virtual camera in the guidance mode.

If, on the other hand, it is judged that the player character 46 which is free is not being displayed on the game screen 60, the microprocessor 14 (switching unit 72d and second control unit 72c) transitions the control mode of the virtual camera 52 to the guidance mode, and updates the state of the virtual camera 52 (S106). In S106, the position and viewing direction of the virtual camera 52 are set in a manner as described below. FIG. 14 is a diagram for explaining an example control of the position and viewing direction of the virtual camera 52 in this case.

The process of S106 is identical to the process of S104 in the following aspects. Specifically, in S106 also, the point of gaze 52b of the virtual camera 52 is set at the position of the player character 46a operated by the user. In addition, the angle $\theta c$ between the straight line from the point of gaze 52b to the virtual camera 52 and the field 42 (XW-ZW plane) is set to a predetermined angle. Moreover, the position and the viewing direction 52a of the virtual camera 52 are set such that the straight line 86a obtained by projecting the straight line 86 on the field 42 matches the ZW-axis direction.

On the other hand, the process of S106 differs from the process of S104 in the following aspects. Specifically, in S106, in order to display both the player characters 46a and 46b on the game screen 60, the distance Lc between the virtual camera 52 and the point of gaze 52b is controlled based on a distance Lf between the position of the player character 46a operated by the user and the position of the player character 46b which is free.

More specifically, first, data in which the distance Lf and the distance Lc are correlated is read from the optical disk 36. The data may be data of a table format or data of an equation format. This data is set such that as the distance Lf is increased, the distance Lc is increased. This is because the virtual camera 52 must be set at a farther point from the point of gaze 52b (field 42) in order to display both the player characters 46a and 46b on the game screen 60 in a case where the distance Lf between the player characters 46a and 46b is large. The distance Lc corresponding to the distance Lf is acquired based on this data, and the distance Lc between the virtual camera 52 and the point of gaze 52b is set to the acquired distance.

With the execution of the above-described process, the virtual camera 52 is set to a farther point from the point of gaze 52b (field 42) as the distance Lf between the player characters 46a and 46b is increased. When the virtual camera 52 is set at a point farther away from the point of gaze 52b (field 42), a broader area is displayed on the game screen 60. More specifically, as shown in FIG. 6, the area 62 displayed on the game screen 60 is broadened, and both the player characters 46a and 46b are displayed on the game screen 60, as shown in FIG. 7. In this manner, the control of the virtual camera 52 as shown in FIG. 6 is realized.

Alternatively, the point of gaze 52b of the virtual camera 52 may be set at a certain position (for example, a midpoint) on a straight line 88 connecting the position of the player character 46a and the position of the player character 46b which is free. With such a configuration, the area 62 displayed on the game screen 60 is moved, and as a result, both the player characters 46a and 46b can be displayed on the game screen 60. In other words, the control of the virtual camera 52 as shown in FIG. 7 can be realized.

If, on the other hand, it is judged in S102 that the player character 46 operated by the user is not in possession of the ball 50, that is, if another player character 46 belonging to the team A is in possession of the ball 50, the microprocessor 14 (acquiring unit 72a) judges whether or not there is an open space for the team A (S107).

Figure 15:
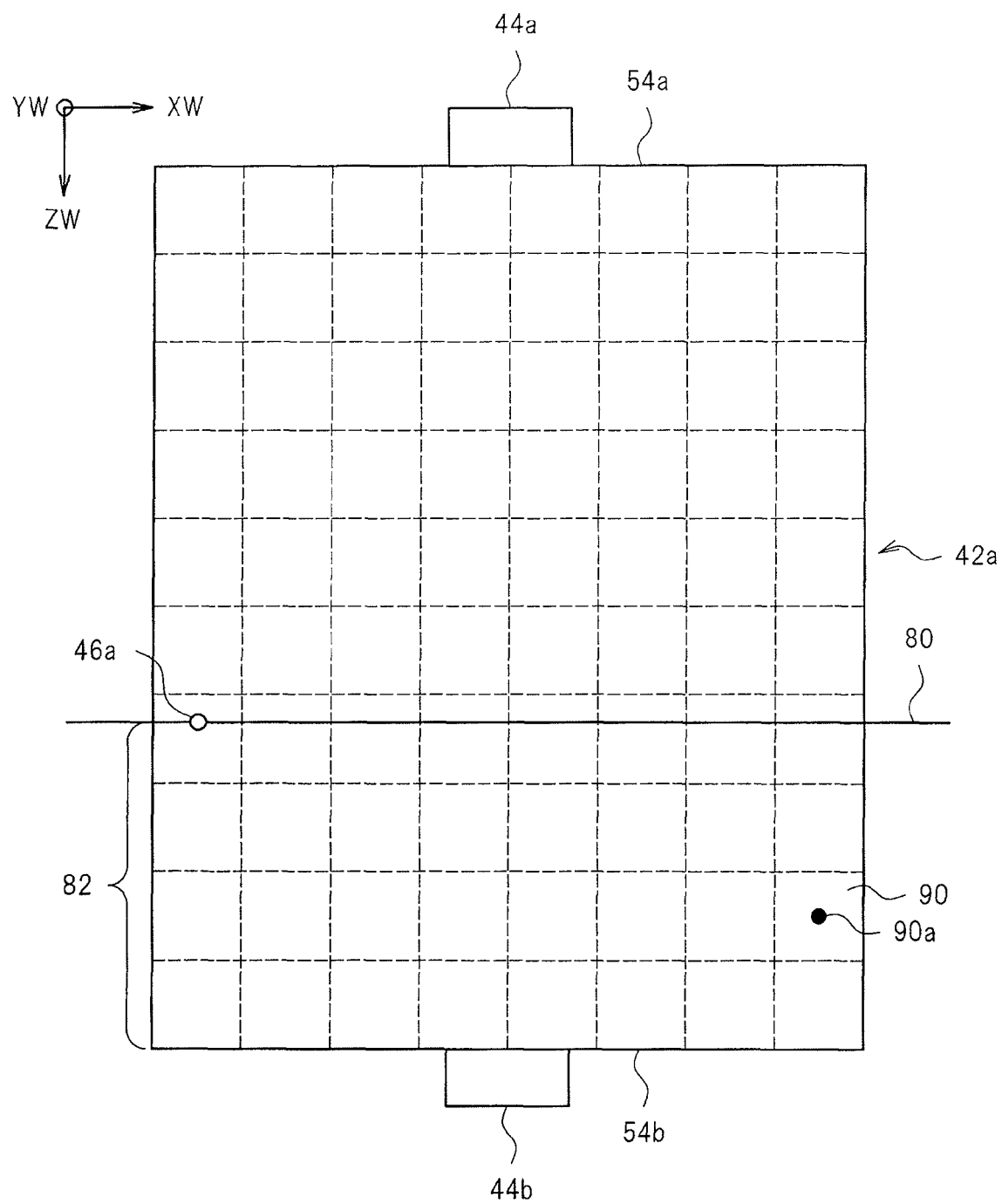
FIG. 15 is a diagram for explaining a process for finding an open space for team A.

The open space for the team A is searched based on the positions of the player characters 46 belonging to the team A and the positions of the player characters 48 belonging to the team B. FIG. 15 is a diagram for explaining a method for finding the open space for the team A. In S106, first, the pitch 42a is divided into M divisions in a longitudinal direction (ZW-axis direction) and is divided into N divisions in a non-longitudinal direction (XW-axis direction), to virtually set a matrix of M×N blocks 90 on the pitch 42a. Then, it is judged whether or not there is a block 90 which satisfies all of the below-described conditions (B1), (B2), and (B3), among the M×N blocks 90.

(B1) The position of the block 90 is included in the search target area 82.

(B2) A first reach time and a second reach time are greater than or equal to a predetermined reference time.

(B3) The first reach time is shorter than the second reach time.

The "first reach time" is the time required for the player character 46a operated by the user to reach the block 90. The first reach time is calculated as follows. First, a distance from the current position of the player character 46a to a center point 90a of the block 90 is calculated. A speed parameter of the player character 46a is read from the optical disk 36. The above-described distance is divided by a speed indicated by the read speed parameter, to calculate the first reach time.

The "second reach time" is the time required for player characters 46 and 48 other than the player character 46a operated by the user to reach the block 90. The second reach time is calculated in a similar manner to that for the first reach time.

The above-described condition (B2) is a condition for finding a block 90 around which no player character 46 or 48 exists. The above-described condition (B3) is a condition for finding a block 90 which the player character 46a operated by the user can reach earlier than the other player characters 46 and 48.

If there is a block 90 which satisfies all of the three conditions (B1) to (B3), the block 90 is judged as an open space for the team A. In other words, it is judged that there is an open space for the team A. If a plurality of blocks 90 which satisfy all of the three conditions (B1) to (B3) exist, one of these blocks 90 is selected as the open space for the team A. For example, a block 90 which is furthest from the position of the player character 46a operated by the user is selected.

If it is judged in S107 that there is no open space for the team A, the control mode of the virtual camera 52 does not need to be transitioned to the guidance mode, and thus the normal mode is continued (S104). If, on the other hand, it is judged in S107 that there is an open space for the team A, the microprocessor 14 (switching unit 72d) judges whether or not the open space is being displayed on the game screen 60 (S108). If it is judged that the open space is being displayed on the game screen 60, the control mode of the virtual camera 52 is not transitioned to the guidance mode, and the normal mode is continued (S104). Alternatively, the control mode of the virtual camera 52 may be transitioned to the guidance mode even if the open space for the team A is being displayed on the game screen 60. By transitioning the control mode of the virtual camera 52 to the guidance mode even if the open space is being displayed on the game screen 60, the position of the virtual camera 52 may be changed, which may facilitate the user recognizing the open space.

Figure 16:
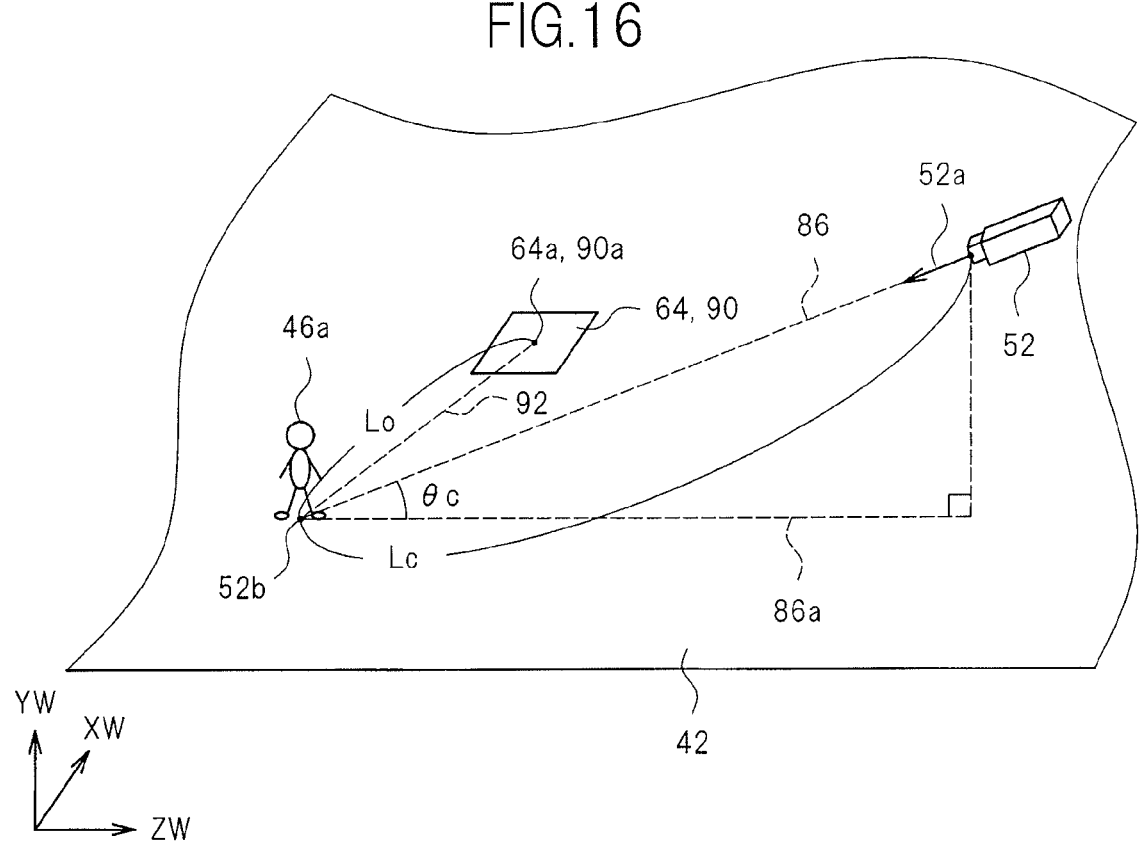
FIG. 16 is a diagram for explaining an example of control of a virtual camera in the guidance mode.

If, on the other hand, it is judged in S108 that the open space is not displayed on the game screen 60, the microprocessor 14 (switching unit 72d and second control unit 72c) transitions the control mode of the virtual camera 52 to the guidance mode, and updates the state of the virtual camera 52 (S109). In S109, the position and viewing direction of the virtual camera 52 are set in a manner as described below. FIG. 16 is a diagram for explaining an example setting of the position and viewing direction of the virtual camera 52 in this case.

A process of S109 is identical to the processes of S104 and S106 in the following aspects. Specifically, in S109 also, the point of gaze 52b of the virtual camera 52 is set to the position of the player character 46a operated by the user. In addition, an angle θc between the straight line 86 from the point of gaze 52b to the virtual camera 52 and the field 42 (XW-ZW plane) is set to a predetermined angle. Moreover, the position and the viewing direction 52a of the virtual camera 52 are set such that the straight line 86a obtained by projecting the straight line 86 on the field 42 matches the ZW-axis direction.

The process of S109 differs from the processes of S104 and S106 in the following aspects. Specifically, in S109, the distance Lc between the virtual camera 52 and the point of gaze 52b is controlled based on a distance Lo between the player character 46a operated by the user and the open space 64, in order to display both the player character 46a and the open space 64 on the game screen 60.

More specifically, first, data in which the distance Lo and the distance Lc are correlated is read from the optical disk 36.

The data may be data of a table format or data of an equation format. In addition, the data is set such that the distance Lc is increased as the distance Lo is increased. This is because the virtual camera 52 must be set at a farther point from the point of gaze 52b (field 42) in order to display both the player character 46a and the open space 64 on the game screen 60 in a case where the distance Lo between the player character 46a and the open space 64 is large. Based on this data, the distance Lc corresponding to the distance Lo is acquired, and the distance Lc between the virtual camera 52 and the point of gaze 52b is set to the acquired distance.

With the execution of the above-described process, the virtual camera 52 is set to a farther point from the point of gaze 52b (field 42) as the distance Lo between the player character 46a and the open space 64 is increased. If the virtual camera 52 is set to a farther point from the point of gaze 52b (field 42), a broader area is displayed on the game screen 60. In other words, the area 62 displayed on the game screen 60 is broadened, and both the player character 46a and the open space 64 are displayed on the game screen 60.

Alternatively, the point of gaze 52 of the virtual camera 52 may be set at a certain position (for example, a midpoint) on a straight line 92 connecting the position of the player character 46a and a representative point 64a of the open space 64. With such a configuration, the area 62 displayed on the game screen 60 is moved, and as a result, both the player character 46a and the open space 64 can be displayed on the game screen 60.

After the state of the virtual camera 52 is updated in S104, S106, or S109, the microprocessor 14 (display control unit 72) updates the game screen 60 (S110). In other words, a game screen 60 representing a scene of the virtual three-dimensional space 40 viewed from the virtual camera 52 is generated in the VRAM. The game screen 60 generated in the VRAM is displayed on the monitor 32 (display unit 74).

[7. Summary]

In the game device 10 described above, because the guidance mode is provided as a control mode of the virtual camera 52, the user can relatively easily know of the player character 46 which is free and the open space.

In addition, in the game device 10, if the player character 46 which is free or the open space which is not displayed on the game screen 60 is found in the state where the control mode of the virtual camera 52 is the normal mode, the control mode of the virtual camera 52 is switched from the normal mode to the guidance mode. Because of this, the user can monitor the switching from the normal mode to the guidance mode, to know that the player character 46 which is free or the open space has been found. In addition, if the switching from the normal mode to the guidance mode is executed, the player character 46 which is free or the open space is newly displayed on the game screen 60. Because of this, in a case where the switching from the normal mode to the guidance mode is executed, the user can relatively easily know the player character 46 which is free or the open space by paying attention to the player character 46 or the area newly displayed on the game screen 60.

In addition, in the game device 10, the control of the virtual camera 52 in the guidance mode is realized with a relatively simply process of controlling the position of the virtual camera 52 based on the distance (Lf or Lo) between the player character 46 operated by the user and the player character 46 which is free or the open space.

[8. Modified Embodiments]

The present invention is not limited to the above-described preferred embodiment.

[8-1. First Modified Embodiment]

The acquiring unit 72a may acquire a movement destination candidate or a pass target candidate of a player character 48 belonging to the team B when the team B is in possession of the ball 50. For example, a position of a player character 48 which is free among the player characters 48 belonging to the team B may be acquired as a pass target candidate of a player character 48 which is in possession of the ball 50. Alternatively, for example, a position of an open space for the team B may be acquired as a movement destination candidate of a player character 48 which is not in possession of the ball 50. With such a configuration, when the team B is in possession of the ball 50, the user can relatively easily know of the player character 48 which is free among the player characters 48 belonging to the team B or the open space for the team B, and the user can defend in consideration of these facts.

The judgment of whether or not there is a player character 48 which is free among the player characters 48 belonging to the team B is executed based on the positions of the player characters 46 belonging to the team A and the positions of the player characters 48 belonging to the team B. This judgment is executed similarly to the case where it is judged whether or not there is a player character 46 which is free among the player characters 46 belonging to the team A (refer to S103 of FIG. 11). That is, it is judged whether or not there is a player character 48 which satisfies both conditions (C1) and (C2) described below, among the player characters 48 belonging to the team B.

(C1) A current position of the player character 48 is in a search target area.

(C2) No player character 46 belonging to the team A is positioned in an area having a distance from the current position of the player character 48 of less than or equal to a reference distance R.

In this case, the "search target area" is an area between a straight line indicating the ZW-axis coordinate value of the player character 48 (or ball 50) which is in possession of the ball 50 and a goal line 54a on the side of the goal 44a of the team A.

On the other hand, the judgment of whether or not there is an open space for the team B is executed based on the positions of the player characters 46 belonging to the team A and the positions of the player characters 48 belonging to the team B. More specifically, this judgment is executed similarly to the judgment of whether or not there is an open space for the team A (refer to S107 of FIG. 11). That is, it is judged whether or not there is a block 90 which satisfies all of the below-described conditions (D1), (D2), and (D3) among the M×N blocks 90.

(D1) A position of the block 90 is included in the search target area.

(D2) A first reach time and a second reach time are greater than or equal to a predetermined reference time.

(D-3) The first reach time is shorter than the second reach time.

In this case, the "search target area" is, for example, an area between a straight line indicating the ZW-axis coordinate value of the player character 48 (or the ball 50) which is in possession of the ball 50 and the goal line 54a on the side of the goal 44a of the team A. In addition, the "first reach time" is a time required for the player character 48 to reach the block 90. The "second reach time" is a time required for other player characters 46 and 48 to reach the block 90.

[8-2. Second Modified Embodiment]

Figure 17:
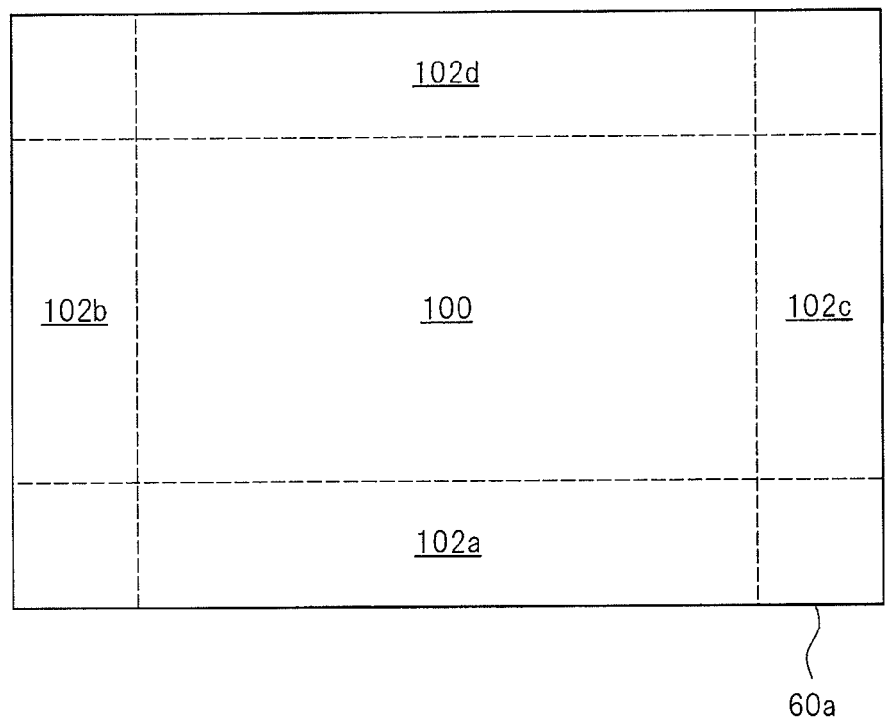
FIG. 17 is a diagram for explaining a game screen in a second alternative embodiment.

A display form of the game screen may be changed based on a change of the control mode of the virtual camera 52. FIG. 17 is a diagram for explaining a game screen in a second modified embodiment of the present invention. As shown in FIG. 17, a game screen 60a in the second modified embodiment comprises a rectangular basic area 100 corresponding to a center area of the game screen 60a, and a plurality of expansion areas 102a, 102b, 102c, and 102d provided on four outer sides of the basic area 100.

Figure 18:
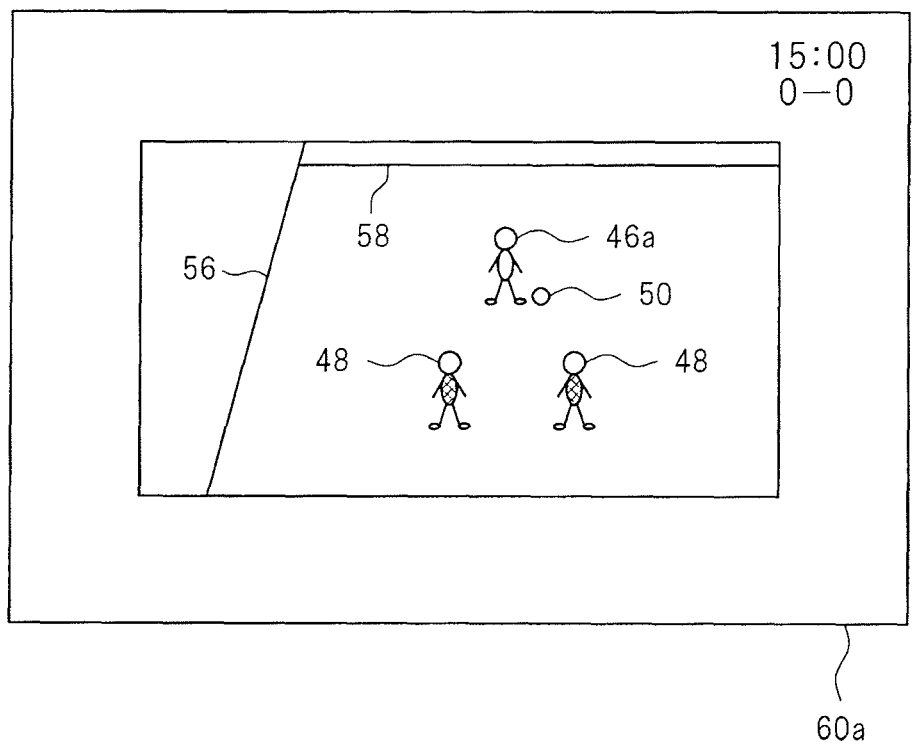
FIG. 18 is a diagram showing an example of a game screen in the normal mode.

FIG. 18 shows an example of the game screen 60a in a case where the control mode of the virtual camera 52 is the normal mode. As shown in FIG. 18, in a case where the control mode of the virtual camera 52 is the normal mode, an image representing a scene of the virtual three-dimensional space 40 viewed from the virtual camera 52 (hereinafter referred to as "field-of-view image") is displayed only in the basic area 100, and is not displayed in the expansion areas 102a, 102b, 102c, and 102d. Alternatively, in the expansion areas 102a, 102b, 102c, and 102d, information (such as the name and parameters) of the player character 46a operated by the user may be displayed. In this case, because the field-of-view image is only displayed in a part of the game screen 60a (basic area 100), the number of player characters 46 and 48 drawn in the game screen 60a tends to be small. As a result, reduction in the processing load can be expected.

Figure 19:
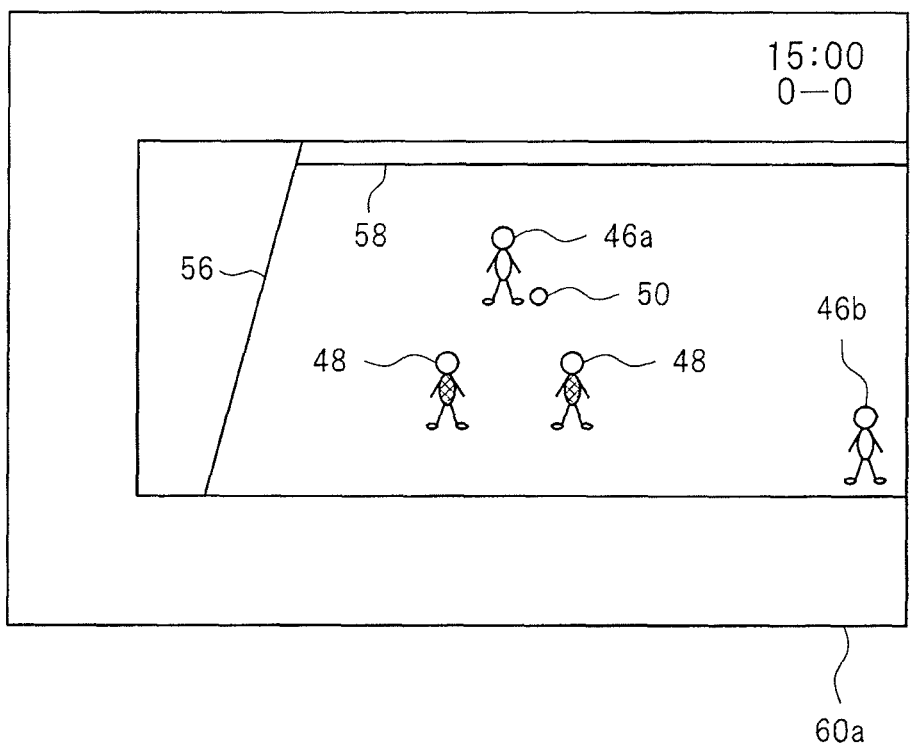
FIG. 19 is a diagram showing an example of a game screen in the guidance mode.

FIG. 19 shows an example of the game screen 60a in a case where the control mode of the virtual camera 52 is the guidance mode. In a case where the control mode of the virtual camera 52 is the guidance mode, an expansion area corresponding to the movement destination candidate or the pass target candidate is judged, and the field-of-view image is displayed in the judged expansion area and the basic area 100. In other words, the field-of-view image is not displayed in expansion areas other than the expansion area corresponding to the movement destination candidate or the pass target candidate. FIG. 19 shows a case where it is judged that the expansion area corresponding to the movement destination candidate or the pass target candidate is the expansion area 102c.

Figure 20:
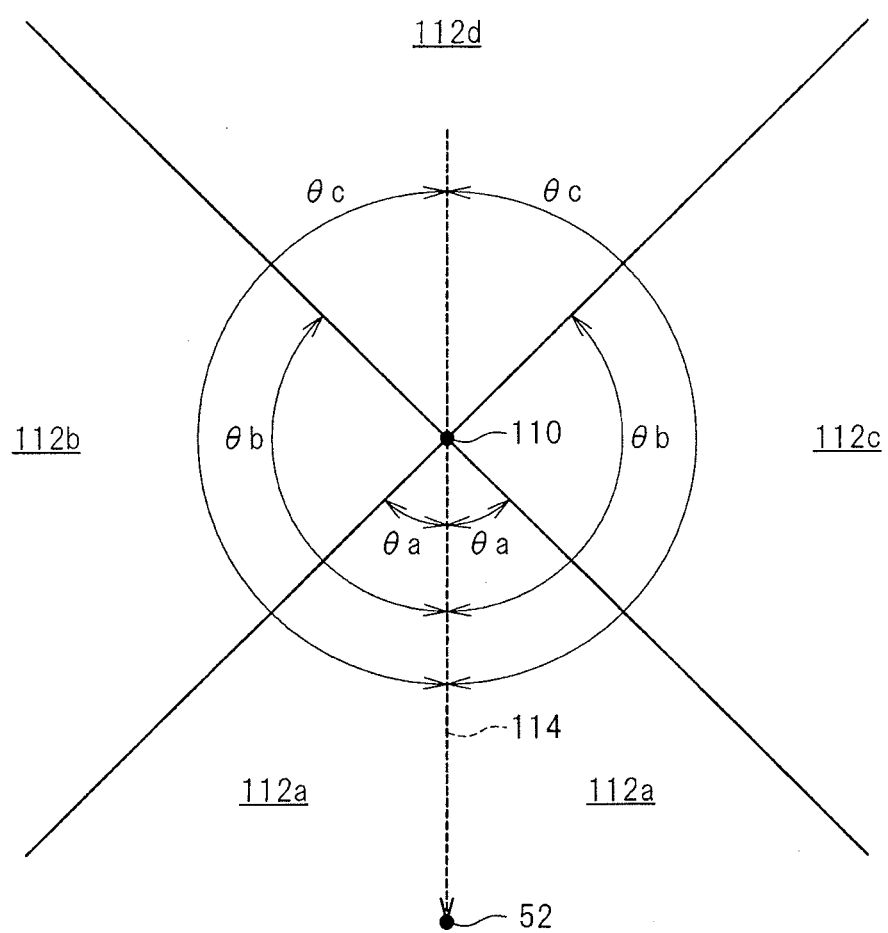
FIG. 20 is a diagram for explaining an example of a method of judging an expansion area corresponding to a movement destination candidate or a pass target candidate.

Next, an example method of judging the expansion area corresponding to the movement destination candidate or the pass target candidate will be described. FIG. 20 is a diagram for explaining an example method of judging the expansion area corresponding to the movement destination candidate or the pass target candidate. In order to judge the expansion area corresponding to the movement destination candidate or the pass target candidate, a plurality of areas 112a, 112b, 112c, and 112d are set in the virtual three-dimensional space 40. The areas 112a, 112b, 112c, and 112d are set based on a relationship between the position of the virtual camera 52 and the position of the reference player character 110 (or the ball 50). In a case where a clockwise direction in FIG. 20 is considered a positive direction, the area 112a is an area which satisfies a condition that an angle θ with respect to a direction 114 from the position of the reference player character 110 to the position of the virtual camera 52 is −θa≤θ≤θa, and corresponds to the expansion area 102a. The area 112b is an area which satisfies a condition that the angle θ with respect to the direction 114 is θa<θ<θb, and corresponds to the expansion area 102b. The area 112c is an area which satisfies a condition that the angle θ with respect to the direction 114 is −b<θ<−a, and corresponds to the expansion area 102c. The area 112d is an area which satisfies a condition that the angle θ with respect to the direction 114 is −c≤θ≤−θb or θb≤θ≤θc, and corresponds to the expansion area 102d.

In a case where the expansion area corresponding to the movement destination candidate or the pass target destination is judged, it is judged which of the areas 112a to 112d the movement destination candidate or the pass target candidate is included in. The expansion area corresponding to the area including the movement destination candidate or the pass target candidate is judged as the expansion area corresponding to the movement destination candidate or the pass target candidate.

An example method of displaying an image in the expansion area will now be described. In this description, a case is considered in which the expansion area corresponding to the movement destination candidate or the pass target candidate is the expansion area 102c.

If the expansion area corresponding to the movement destination candidate or the pass target candidate is the expansion area 102c, the states (position, viewing direction, and angle of view) of the virtual camera 52 are adjusted so that the area of the virtual three-dimensional space 40 displayed on the game screen 60a (basic area 100) in a case where the control mode of the virtual camera 52 is the normal mode, and a part of the area 112c corresponding to the expansion area 102c, are represented in the field-of-view image. The field-of-view image of the virtual camera 52 is displayed using the basic area 100 and the expansion area 102c. Here, for example, if the movement destination candidate or the pass target candidate is very far from the reference player character 110, the movement destination candidate or the pass target candidate may sometimes not be displayed on the game screen 60a (expansion area 102c). However, with the display of the field-of-view image also in the expansion area 102c, the user can understand that there is a movement destination candidate or a pass target candidate in the direction corresponding to the expansion area 102c.

Alternatively, the field-of-view image displayed on the game screen 60a (basic area 100) in a case where the control mode of the virtual camera 52 is the normal mode may be displayed using the basic area 100 and expansion area 102c. In this configuration also, the user can understand that there is a movement destination candidate or a pass target candidate in a direction corresponding to the expansion area 102c.

Alternatively, a larger image may be generated in advance as the field-of-view image of the virtual camera 52. If the control mode of the virtual camera 52 is the normal mode, an image, in the field-of-view image, of a portion corresponding to the basic area 100 may be displayed on the game screen 60a (basic area 100). If the control mode of the virtual camera 52 is the guidance mode, for example, the image, in the field-of-view image, of a portion corresponding to the basic area 100 may be displayed on the game screen 60a (basic area 100) and an image, in the field-of-view image, of a portion corresponding to the expansion area 102c may be displayed on the game screen 60a (expansion area 102c).

Alternatively, if the control mode of the virtual camera 52 is the normal mode, the field-of-view image may be displayed on the entirety of the game screen 60a. If the control mode of the virtual camera 52 is the guidance mode, the display of the field-of-view image on the expansion area other than the expansion area corresponding to the movement destination candidate or the pass target candidate may be restricted. With this configuration also, the user can understand that there is a movement destination candidate or the pass target candidate in a direction corresponding to the expansion area in which the field-of-view image is displayed.

[8-3. Third Modified Embodiment]

The acquiring unit 72a may acquire a position other than the position of the player character 46 or 48 which is free or the position of the open space as the movement destination candidate or the pass target candidate.

[8-4. Other Modified Embodiments]

The game executed in the game device 10 is not limited to games in which a three-dimensional game space formed with three coordinate elements is displayed on the game screen 60. The game executed in the game device 10 may be a game in which a two-dimensional game space formed by two coordinate elements is displayed on the game screen 60. In other words, the game executed in the game device 10 may be a game in which the positions or the like of the player characters 46 and 48 and the ball 50 are managed with two coordinate elements.

In addition, the game executed in the game device 10 may be a sport game other than the soccer game. For example, the present invention can be applied to a game which simulates basketball, rugby, or American football played using a ball (moving object), or a game which simulates ice hockey played using a puck (moving object).

The invention claimed is:

1. A game device which executes a sport game played between a first team and a second team using a moving object, the game device comprising:
   a memory storage that stores positions, in a game space, of player characters belonging to the first team, player characters belonging to the second team, and the moving object; and
   a processor that reads the positions from memory storage and displays a partial area of the game space on a game screen based on a position of a reference player character selected from among the player characters belonging to the first team and the player characters belonging to the second team, or the position of the moving object, wherein
   the processor:
   determines, based on the positions of the player characters belonging to the second team in a case where the first team is in possession of the moving object, a position of an open space or a position of a player character belonging to the first team who is free as a movement destination candidate or a pass target candidate of a player character belonging to the first team; and
   controls the partial area based on the position of the reference player character or the position of the moving object, and the position of the open space or the position of the player character belonging to the first team who is free determined as the movement destination candidate or the pass target candidate,
   wherein when the processor determines that the position of the open space or the position of the player character belonging to the first team who is free determined as the movement destination candidate or the pass target candidate is not displayed on the game screen, the processor controls the partial area so that one of the reference player character and the moving object, and one of the position of the open space and the position of the player character belonging to the first team who is free determined as the movement destination candidate or the pass target candidate are both displayed on the game screen,
   wherein the game screen represents a scene of the game space viewed from a virtual camera, and wherein the processor controls the partial area by controlling a state of the virtual camera based on the position of the reference player character or the position of the moving object.

2. The game device according to claim 1, wherein
the processor controls the partial area by controlling the state of the virtual camera based on the position of the reference player character or the position of the moving object, and the position of the open pace of the position of the player character belonging to the first team who is free determined as the movement destination candidate or the pass target candidate.

3. The game device according to claim 2, wherein
the processor controls the state of the virtual camera based on a distance between the position of the reference player character or the position of the moving object, and the position of the open space or the position of the player character belonging to the first team who is free determined as the movement destination candidate or the pass target candidate.

4. The game device according to claim 1, wherein
the processor controls the partial area according to:
a first mode that controls the partial area based on the position of the reference player character or the position of the moving object;
a second mode that controls the partial area based on the position of the reference player character or the position of the moving object, and the position of the open space or the position of the player character belonging to the first team who is free determined as the movement destination candidate or the pass target candidate; and
the processor switches between a state in which the control is executed in the first mode and a state in which the control is executed in the second control mode.

5. The game device according to claim 4, wherein
the processor switches from the state in which the control is executed in the first mode to the state in which the control is executed in the second mode if the position of the open space or the position of the player character belonging to the first team who is free determined as the movement destination candidate or the pass target candidate is not included in the partial area in a case where the control is executed in the first mode.

6. A game device which executes a sport game played between a first team and a second team using a moving object, the game device comprising:
   a memory storage that stores positions, in a game space, of player characters belonging to the first team, player characters belonging to the second team, and the moving object; and
   a processor that reads the positions from memory storage and displays a partial area of the game space on a game screen based on a position of a reference player character selected from among the player characters belonging to the first team and the player characters belonging to the second team, or the position of the moving object,
   wherein the processor:
   acquires, in a case where the first team is in possession of the moving object, a movement destination candidate or a pass target candidate of a player character belonging to the first team based on the positions of the player characters belonging to the second team; and
   controls the partial area according to:
   a first mode that controls the partial area based on the position of the reference player character or the position of the moving object;
   a second mode that controls the partial area based on the position of the reference player character or the position of the moving object, and the acquired movement destination candidate or the acquired pass target candidate; and the processor switches between a state in which the control is executed in the first mode and a state in which the control is executed in the second mode, wherein the processor switches from the state in which the control is executed in the first mode to the state in which the control is executed in the second mode if the acquired movement destination candidate or the acquired pass target candidate is not included in the partial area in a case where the control is executed in the first mode, the game device further comprising:

a memory that stores match status information indicating a match status, wherein the processor switches from the state in which the control is executed in the first mode to the state in which the control is executed in the second mode based on a given probability, if the acquired movement destination candidate or the acquired pass target candidate is not included in the partial area in the case where the control is executed in the first mode; and controls the probability based on the stored match status information, wherein the game screen represents a scene of the game space viewed from a virtual camera, and wherein the processor controls the partial area by controlling a state of the virtual camera based on the position of the reference player character or the position of the moving object.

7. The game device according to claim 1, wherein the game screen comprises a plurality of portion areas, and the processor restricts display of the partial area of the game space to a portion area, among the plurality of portion areas, other than a portion area corresponding to the position of the open space or the position of the player character belonging to the first team who is free determined as the movement destination candidate or the pass target candidate.

8. A method for controlling a game device which includes a processor and a memory storage and which executes a sport game played between a first team and a second team using a moving object, the method comprising:

reading from the memory storage positions, in a game space, of player characters belonging to the first team, player characters belonging to the second team, and the moving object; and displaying, by the processor, a partial area of the game space on a game screen based on a position of a reference player character selected from among the player characters belonging to the first team and the player characters belonging to the second team, or the position of the moving object, wherein the displaying the partial area comprises:

determining, by the processor, in a case where the first team is in possession of the moving object, a position of an open space or a position of a player character belonging to the first team who is free as a movement destination candidate or a pass target candidate of a player character belonging to the first team based on the positions of the player characters belonging to the second team that are read from the memory storage; and controlling, by the processor, the display of the partial area based on the position of the reference player character or the position of the moving object, and the position of the open space or the position of the player character belonging to the first team who is free determined as the movement destination candidate or the pass target candidate, wherein if it is determined that the position of the open space or the position of the player character belonging to the first team who is free determined as the movement destination candidate or the pass target candidate is not displayed on the game screen, the partial area is controlled so that one of the reference player character and moving object, and one of the position of the open space and the position of the player character belonging to the first team who is free determined as the movement destination candidate or the pass target candidate are both displayed on the game screen, wherein the game screen represents a scene of the game space viewed from a virtual camera, and wherein the processor controls the partial area by controlling a state of the virtual camera based on the position of the reference player character or the position of the moving object.

9. A non-transitory computer-readable information storage medium which stores a program including instructions for causing a computer to execute a sport game played between a first team and a second team using a moving object, the instructions causing the computer to:

read, from a storage memory, positions, in a game space, of player characters belonging to the first team, player characters belonging to the second team, and the moving object; and display a partial area of the game space on a game screen based on a position of a reference player character selected from among the player characters belonging to the first team and the player characters belonging to the second team, or the position of the moving object, wherein the instructions that cause the computer to display a partial area further comprise instructions to cause the computer to:

determine, in a case where the first team is in possession of the moving object, a position of an open space or a position of a player character belonging to the first team who is free as a movement destination candidate or a pass target candidate of a player character belonging to the first team based on the read positions of the player characters belonging to the second team; and control the partial area based on the position of the reference player character or the position of the moving object, and the position of the open space or the position of the player character belonging to the first team who is free determined as the movement destination candidate or the pass target candidate, wherein if it is determined that the position of the open space or the position of the player character belonging to the first team who is free determined as the movement destination candidate or the pass target candidate is not displayed on the game screen, the partial area is controlled so that one of the reference player character and moving object, and one of the position of the open space and the position of the player character belonging to the first team who is free determined as the movement destination candidate or the pass target candidate are both displayed on the game screen, wherein the game screen represents a scene of the game space viewed from a virtual camera, and wherein the computer controls the partial area by controlling a state of the virtual camera based on the position of the reference player character or the position of the moving object.

10. The game device of claim 1,
wherein the processor controls the partial area based on the position of the reference player character or the position of the moving object, the position of the open space or the position of the player character belonging to the first team who is free determined as the movement destination candidate or the pass target candidate, and a condition related to the reference player character, and
the condition comprises whether an ability parameter of the reference player character is greater than or equal to a threshold.

11. The game device of claim 10, wherein the ability parameter is a level of an ability of the reference player character to find the movement destination candidate or the pass target candidate.

12. A game device which executes a sport game played between a first team and a second team using a moving object, the game device comprising:
a memory storage that stores positions, in a game space, of player characters belonging to the first team, player characters belonging to the second team, and the moving object; and
a processor that reads the positions from memory storage and displays a partial area of the game space on a game screen based on a position of a reference player character selected from among the player characters belonging to the first team and the player characters belonging to the second team, or the position of the moving object, wherein
the processor:
acquires, in a case where the first team is in possession of the moving object, a movement destination candidate or a pass target candidate of a player character belonging to the first team based on the positions of the player characters belonging to the second team; and
controls the partial area based on the position of the reference player character or the position of the moving object, the acquired movement destination candidate or the acquired pass target candidate, and a condition related to the reference player character,
wherein the condition is based on a given probability,
wherein the game screen represents a scene of the game space viewed from a virtual camera, and wherein the processor controls the partial area by controlling a state of the virtual camera based on the position of the reference player character or the position of the moving object.

13. The game device of claim 12, wherein the given probability is based on a current match status.

14. A game device which executes a game, the game device comprising:
a memory that stores positions, in a game space of the game, of a moving object of the game, player characters belonging to a first team of the game, and player characters belonging to a second team of the game; and
a processor that is programmed to
determine a position of an open space or a position of a player character belonging to the first team who is free as a movement destination candidate or a pass target candidate of a reference player character belonging to the first team based on the positions of the player characters belonging to the second team;
control a state of a virtual camera to switch between a first mode in which the virtual camera displays a first partial area based on the reference player character or the moving object, and a second mode in which the virtual camera displays a second partial area based on both the reference player character or the moving object and the position of the open space or the position of the player character belonging to the first team who is free determined as the moving target candidate or the pass target candidate,
wherein the game screen represents a scene of the game space viewed from a virtual camera, and wherein the processor controls the partial area by controlling a state of the virtual camera based on the position of the reference player character or the position of the moving object.

15. The game device of claim 14, wherein
the state of the virtual camera is switched based on a condition related to the reference player character, and
the condition comprises whether an ability parameter of the reference player character is greater than or equal to a threshold.

16. The game device of claim 15, wherein the ability parameter is a level of an ability of the reference player character to find the movement destination candidate or the pass target candidate.

17. A game device which executes a game, the game device comprising:
a memory that stores positions, in a game space of the game, of a moving object of the game, player characters belonging to a first team of the game, and player characters belonging to a second team of the game; and
a processor that is programmed to:
acquire a movement destination candidate or a pass target candidate of a reference player character belonging to the first team based on the positions of the player characters belonging to the second team;
control a state of a virtual camera to switch between a first mode in which the virtual camera displays a first partial area based on the reference player character or the moving object, and a second mode in which the virtual camera displays a second partial area based on both the reference player character or the moving object and the moving target candidate or the pass target candidate, the state of the virtual camera being switched based on a condition related to the reference player character,
wherein the condition is based on a given probability,
wherein the game screen represents a scene of the game space viewed from a virtual camera, and wherein the processor controls the partial area by controlling a state of the virtual camera based on the position of the reference player character or the position of the moving object.

18. The game device of claim 17, wherein the given probability is based on a current match status.

19. A method for controlling a game device which includes a processor and a memory storage and which executes a sport game played between a first team and a second team using a moving object, the method comprising:
reading from the memory storage positions, in a game space, of player characters belonging to the first team, player characters belonging to the second team, and the moving object; and
displaying, by the processor, a partial area of the game space on a game screen based on a position of a reference player character selected from among the player characters belonging to the first team and the player characters belonging to the second team, or the position of the moving object, wherein the displaying a partial area comprises:
acquiring, by the processor, in a case where the first team is in possession of the moving object, a movement destination candidate or a pass target candidate of a player character belonging to the first team based on the positions of the player characters belonging to the second team that are read from the memory storage;
controlling the partial area according to:
a first mode that controls the partial area based on the position of the reference player character or the position of the moving object;
a second mode that controls the partial area based on the position of the reference player character or the position of the moving object, and the acquired movement destination candidate or the acquired pass target candidate; and
switching between a state in which the control is executed in the first mode and a state in which the control is executed in the second mode, and
wherein the switching comprises:
switching from the state in which the control is executed in the first mode to the state in which the control is executed in the second mode based on a given probability, if the acquired movement destination candidate or the acquired pass target candidate is not included in the partial area in a case where the control is executed in the first mode; and
controlling the probability based on match status information stored in a memory, the match status information indicating a match status,
wherein the game screen represents a scene of the game space viewed from a virtual camera, and wherein the processor controls the partial area by controlling a state of the virtual camera based on the position of the reference player character or the position of the moving object.

20. A non-transitory computer-readable information storage medium which stores a program including instructions for causing a computer to execute a sport game played between a first team and a second team using a moving object, the instructions causing the computer to:
read, from a storage memory, positions, in a game space, of player characters belonging to the first team, player characters belonging to the second team, and the moving object; and
display a partial area of the game space on a game screen based on a position of a reference player character selected from among the player characters belonging to the first team and the player characters belonging to the second team, or the position of the moving object, wherein
the instructions that cause the computer to display a partial area further comprise instructions to cause the computer:
acquire, in a case where the first team is in possession of the moving object, a movement destination candidate or a pass target candidate of a player character belonging to the first team based on the read positions of the player characters belonging to the second team; and
control the partial area according to:
a first mode that controls the partial area based on the position of the reference player character or the position of the moving object;
a second mode that controls the partial area based on the position of the reference player character or the position of the moving object, and the acquired movement destination candidate or the acquired pass target candidate; and
switch between a state in which the control is executed in the first mode and a state in which the control is executed in the second mode
wherein the instructions cause the computer to:
switches switch from the state in which the control is executed in the first mode to the state in which the control is executed in the second mode based on a given probability, if the acquired movement destination candidate or the acquired pass target candidate is not included in the partial area in a case where the control is executed in the first mode; and
control the probability based on match status information stored in a memory, the match status information indicating a match status,
wherein the game screen represents a scene of the game space viewed from a virtual camera, and wherein the computer controls the partial area by controlling a state of the virtual camera based on the position of the reference player character or the position of the moving object.

21. A method for controlling a game device which includes a processor and a memory storage and which executes a sport game played between a first team and a second team using a moving object, the method comprising:
reading, from the memory storage using the processor, positions in a game space, of player characters belonging to the first team, player characters belonging to the second team, and the moving object;
displaying, using the processor, a partial area of the game space on a game screen based on a position of a reference player character selected from among the player characters belonging to the first team and the player characters belonging to the second team, or the position of the moving object;
acquiring, using the processor, in a case where the first team is in possession of the moving object, a movement destination candidate or a pass target candidate of a player character belonging to the first team based on the positions of the player characters belonging to the second team; and
controlling, using the processor, the partial area based on the position of the reference player character or the position of the moving object, the acquired movement destination candidate or the acquired pass target candidate, and a condition related to the reference player character,
wherein the condition is based on a given probability,
wherein the game screen represents a scene of the game space viewed from a virtual camera, and wherein the processor controls the partial area by controlling a state of the virtual camera based on the position of the reference player character or the position of the moving object.

22. A non-transitory computer-readable information storage medium which stores a program including instructions for causing a computer to execute a sport game played between a first team and a second team using a moving object, the instructions causing the computer to:
read, from a memory storage, positions, in a game space, of player characters belonging to the first team, player characters belonging to the second team, and the moving object;
display a partial area of the game space on a game screen based on a position of a reference player character selected from among the player characters belonging to the first team and the player characters belonging to the second team, or the position of the moving object;

acquire, in a case where the first team is in possession of the moving object, a movement destination candidate or a pass target candidate of a player character belonging to the first team based on the positions of the player characters belonging to the second team; and control the partial area based on the position of the reference player character or the position of the moving object, the acquired movement destination candidate or the acquired pass target candidate, and a condition related to the reference player character, wherein the condition is based on a given probability, wherein the game screen represents a scene of the game space viewed from a virtual camera, and wherein the computer controls the partial area by controlling a state of the virtual camera based on the position of the reference player character or the position of the moving object.

23. A method for controlling a game device which includes a processor and a memory storage and which executes a sport game played between a first team and a second team using a moving object, the method comprising:

reading, using the processor, positions, in a game space of the game, of a moving object of the game, player characters belonging to a first team of the game, and player characters belonging to a second team of the game;

acquiring, using the processor, a movement destination candidate or a pass target candidate of a reference player character belonging to the first team based on the positions of the player characters belonging to the second team; and controlling a state of a virtual camera to switch between a first mode in which the virtual camera displays a first partial area based on the reference player character or the moving object, and a second mode in which the virtual camera displays a second partial area based on both the reference player character or the moving object and the moving target candidate or the pass target candidate, the state of the virtual camera being switched based on a condition related to the reference player character, wherein the condition is based on a given probability, wherein the game screen represents a scene of the game space viewed from a virtual camera, and wherein the processor controls the partial area by controlling a state of the virtual camera based on the position of the reference player character or the position of the moving object.

24. A non-transitory computer-readable information storage medium which stores a program including instructions for causing a computer to execute a sport game played between a first team and a second team using a moving object, the instructions causing the computer to:

read positions, in a game space of the game, of a moving object of the game, player characters belonging to a first team of the game, and player characters belonging to a second team of the game;

acquire a movement destination candidate or a pass target candidate of a reference player character belonging to the first team based on the positions of the player characters belonging to the second team, and control a state of a virtual camera to switch between a first mode in which the virtual camera displays a first partial area based on the reference player character or the moving object, and a second mode in which the virtual camera displays a second partial area based on both the reference player character or the moving object and the moving target candidate or the pass target candidate, the state of the virtual camera being switched based on a condition related to the reference player character, wherein the condition is based on a given probability, wherein the game screen represents a scene of the game space viewed from a virtual camera, and wherein the computer controls the partial area by controlling a state of the virtual camera based on the position of the reference player character or the position of the moving object.

* * * * *